US009854453B2

(12) United States Patent
Wang et al.

(10) Patent No.: US 9,854,453 B2
(45) Date of Patent: Dec. 26, 2017

(54) METHODS FOR WIFI SECTORIZATION MAC ENHANCEMENT

(71) Applicant: INTERDIGITAL PATENT HOLDINGS, INC., Wilmington, DE (US)

(72) Inventors: Xiaofei Wang, Cedar Grove, NJ (US); Guodong Zhang, Syosset, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 100 days.

(21) Appl. No.: 14/888,622

(22) PCT Filed: May 1, 2014

(86) PCT No.: PCT/US2014/036379
§ 371 (c)(1),
(2) Date: Nov. 2, 2015

(87) PCT Pub. No.: WO2014/179575
PCT Pub. Date: Nov. 6, 2014

(65) Prior Publication Data
US 2016/0066198 A1    Mar. 3, 2016

Related U.S. Application Data

(60) Provisional application No. 61/819,153, filed on May 3, 2013, provisional application No. 61/832,003, filed on Jun. 6, 2013.

(51) Int. Cl.
*H04W 4/00* (2009.01)
*H04W 16/28* (2009.01)
(Continued)

(52) U.S. Cl.
CPC .......... *H04W 16/28* (2013.01); *H04B 7/0617* (2013.01); *H04W 72/046* (2013.01); *H04W 74/0816* (2013.01); *H04W 84/12* (2013.01)

(58) Field of Classification Search
CPC ............... H04W 16/28; H04W 72/046; H04W 74/0816; H04W 84/12; H04B 7/0617
See application file for complete search history.

(56) References Cited

U.S. PATENT DOCUMENTS

2003/0152086 A1    8/2003    El Batt
2004/0037258 A1 *  2/2004    Scherzer ............... H04W 28/18
                                                          370/338

(Continued)

FOREIGN PATENT DOCUMENTS

WO    2008/002883    1/2008

OTHER PUBLICATIONS

Calcev et al., "Sectorization for Hidden Node Mitigation," Doc:11-12-0852-00-00ah, (Jul. 2012).

(Continued)

*Primary Examiner* — Clemence Han
(74) *Attorney, Agent, or Firm* — Volpe and Koenig, P.C.

(57) ABSTRACT

A method and apparatus may be used for WiFi sectorization medium access control enhancement (WiSE MAC). An IEEE 802.11 STA may receive an omni-directional indication of a first sectorized transmission opportunity (TXOP) associated with a second STA. The omni-directional indication may include an identifier (ID) of a first sector associated with the first sectorized TXOP. The STA may transmit a directional indication of a second sectorized TXOP a condition that a second sector associated with the second sectorized TXOP does not interfere with the first sector associated with the first sectorized TXOP.

18 Claims, 16 Drawing Sheets

(51) Int. Cl.
*H04W 74/08* (2009.01)
*H04B 7/06* (2006.01)
*H04W 72/04* (2009.01)
*H04W 84/12* (2009.01)

(56) References Cited

U.S. PATENT DOCUMENTS

| | | | |
|---|---|---|---|
| 2008/0039046 A1* | 2/2008 | Vilzmann | H04W 74/0825 455/296 |
| 2009/0232109 A1* | 9/2009 | Nandagopalan | H04W 16/28 370/336 |
| 2010/0014457 A1* | 1/2010 | Nandagopalan | H04W 16/28 370/328 |
| 2010/0165963 A1 | 7/2010 | Chu et al. | |
| 2011/0149842 A1* | 6/2011 | Cordeiro | H04B 7/0491 370/328 |
| 2011/0287796 A1* | 11/2011 | Jain | H04W 72/046 455/509 |
| 2012/0051338 A1* | 3/2012 | Seok | H04W 74/085 370/337 |
| 2014/0153415 A1* | 6/2014 | Choudhury | H04W 72/0446 370/252 |

OTHER PUBLICATIONS

Gong, et al., "11ah Channelization of China," IEEE 802.11-11/1320r0, (Sep. 2011).

IEEE 802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE 802.11ad-2012 (Dec. 2012).

IEEE P802.11ac/D3.0, Draft Standard for Information Technology—Telecommunications and information exchange between systems—Local and metropolitan area networks—Specific requirements; Part 11: Wireless LAN Medium Access Control (MAC) and Physical Layer (PHY) specifications, Amendment 4: Enhancements for Very High Throughput for Operation in Bands below 6 GHz, IEEE P802.11ac/D3.0 (Jun. 2012).

IEEE P802.11ah/D1.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D1.0 (Oct. 2013).

IEEE Standard for Information technology—Telecommunications and information exchange between systems—Local and metropolitan area networks—Specific requirement; Part 11: Wireless LAN Medium Access Control (MAC and Physical Layer (PHY) Specifications, IEEE Std. 802.11-2012 (Mar. 2012).

IEEE Standard for Information technology—Telecommunications and information exchange between systems, Local and metropolitan area networks—Specific requirement; Part 11: Wireless LAN Medium Access Control (MAC) and Physical Layer (PHY) Specifications, Amendment 2: MAC Enhancements for Robust Audio Video Streaming, Approved Mar. 29, 2012 IEEE-SA Standards Board, IEEE Std 802.11aa™-2012 (May 2012).

IEEE Standard for Information Technology—Telecommunications and information exchange between systems—Local and metropolitan area networks—Specific requirement; Part 11: Wireless LAN Medium Access Control (MAC) and Physical Layer (PHY) Specifications. Prepared by the 802.11 Working Group of the LAN/MAN Standards Committee of the IEEE Computer Society, IEEE Draft P802.11-REVmb™/D12, Nov. 2011, (Nov. 2011).

IEEE Standard for Information technology—Telecommunications and information exchange between systems—Local and metropolitan area networks—Specific requirements, Part 15.4: Wireless Medium Access Control (MAC) and Physical Layer (PHY) Specifications for Low-Rate Wireless Personal Area Networks (WPANs), IEEE Std 802.15.4™-2006 (Sep. 2006).

IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz, IEEE Std 802.11ac (Dec. 2013).

IEEE Standard for Local and metropolitan area networks—Part 15.4: Low-Rate Wireless Personal Area Networks (LR-WPANs), Amendment 3: Physical Layer (PHY) Specifications for Low-Data-Rate, Wirless Smart Metering Utility Networks, IEEE Std 802.15.4g-2012 (Apr. 2012).

Lal et al., "A Novel MAC Layer Protocol for Space Division Multiple Access in Wireless Ad Hoc Networks," Computer Communications and Networks, 2002. Proceedings. Eleventh International Conference on, pp. 614-619 (2002).

Wang et al., "Sectorization Follow Up 2," IEEE 802.11-13/0081r1, (Jan. 2013).

Wang et al., "Sectorized Beam Operation Follow-up 3," IEEE 802.11-13/0302r1, (Mar. 2013).

Wang et al., "Sectorized Beam Operation," IEEE 802.11-12/1103r0, (Sep. 2012).

Wang et al., IEEE 802.11-12/1355r2, (Nov. 2012).

* cited by examiner

| 202 | 204 | 206 | 208 | 210 | 212 | 214 | 216 | 218 | |
|---|---|---|---|---|---|---|---|---|---|
| Element ID | Length | Potential Traffic Self | Allocated Traffic Self | Allocated Traffic Shared | EDCA Access Factor | HCCA Peak | HCCA Access Factor | Overlap | Sharing Policy | Optional Subelements |
| 1 | 1 | 5 | 5 | 5 | 1 | 2 | 1 | 1 | 1 | Variable |

Octets:

| 302 | 304 | 306 | 308 |
|---|---|---|---|
| Mean | Standard Deviation | Reserved | AC_VO Streams | AC_VI Streams |
| 16 | 14 | 2 | 4 | 4 |

Bits:

| 400 | 404 | 408 | 412 | 414 |
|---|---|---|---|---|
| Beacon Sector 1 | Beacon Sector 2 | Beacon Sector 3 | Omni Beacon | |

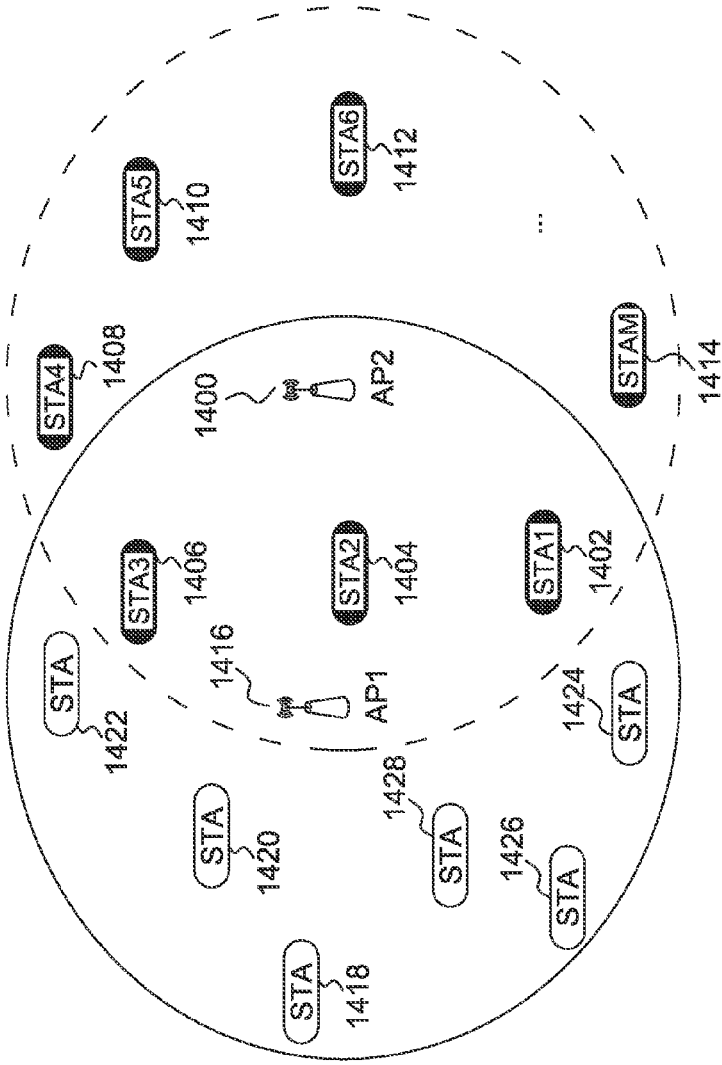

| Element ID | Length | Fast Sector Feedback Capable | Fast Sector Feedback Operation | Accepted SO Conditions | Sectorization Directions | HMP/ODSP Usage |
|---|---|---|---|---|---|---|
| 1902 | 1904 | 1906 | 1908 | 1910 | 1912 | 1914 |

METHODS FOR WIFI SECTORIZATION MAC ENHANCEMENT

CROSS REFERENCE TO RELATED APPLICATIONS

This application claims the benefit of U.S. Provisional Application No. 61/819,153 filed May 3, 2013, and U.S. Provisional Application No. 61/832,003 filed Jun. 6, 2013, the contents of which are hereby incorporated by reference herein.

BACKGROUND

A WLAN in Infrastructure basic service set (IBSS) mode has an Access Point (AP) for the BSS and one or more stations (STAs) associated with the AP. The AP typically has access or an interface to a distribution system (DS), or another type of wired/wireless network that carries traffic in/out of the BSS, such as from/to the Internet. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent to through the AP, wherein the source STA sends traffic to the AP and the AP delivers the traffic to the destination STA. Such traffic between STAs within a BSS is considered peer-to-peer traffic. Such peer-to-peer traffic may also be sent directly between the source STA and destination STAs with a direct link setup (DLS) using an IEEE 802.11e DLS or an IEEE 802.11z tunneled DLS (TDLS). A WLAN in Independent BSS mode has no AP, and therefore STAs communicate directly with each other.

SUMMARY

A method and apparatus may be used for WiFi sectorization medium access control enhancement (WiSE MAC). An IEEE 802.11 STA may receive an omni-directional indication of a first sectorized transmission opportunity (TXOP) associated with a second STA. The omni-directional indication may include an identifier (ID) of a first sector associated with the first sectorized TXOP. The STA may transmit a directional indication of a second sectorized TXOP a condition that a second sector associated with the second sectorized TXOP does not interfere with the first sector associated with the first sectorized TXOP.

BRIEF DESCRIPTION OF THE DRAWINGS

A more detailed understanding may be had from the following description, given by way of example in conjunction with the accompanying drawings wherein:

FIG. 2 shows a QLoad Report element as specified in the IEEE 802.11aa standard;

FIG. 3 shows a QLoad field format as specified by the IEEE 802.11aa standards;

FIG. 4 illustrates an example sectorized operation;

FIG. 13 is example design of the Overlapping Basic Service Set (OBSS) Capability information element (IE);

FIG. 14 shows an example scenario of two overlapping BSSs in which two APs are both capable of performing sectorized transmissions;

FIG. 19 is an example design of the Fast Sector Feedback IE.

DETAILED DESCRIPTION

Figure 1A:
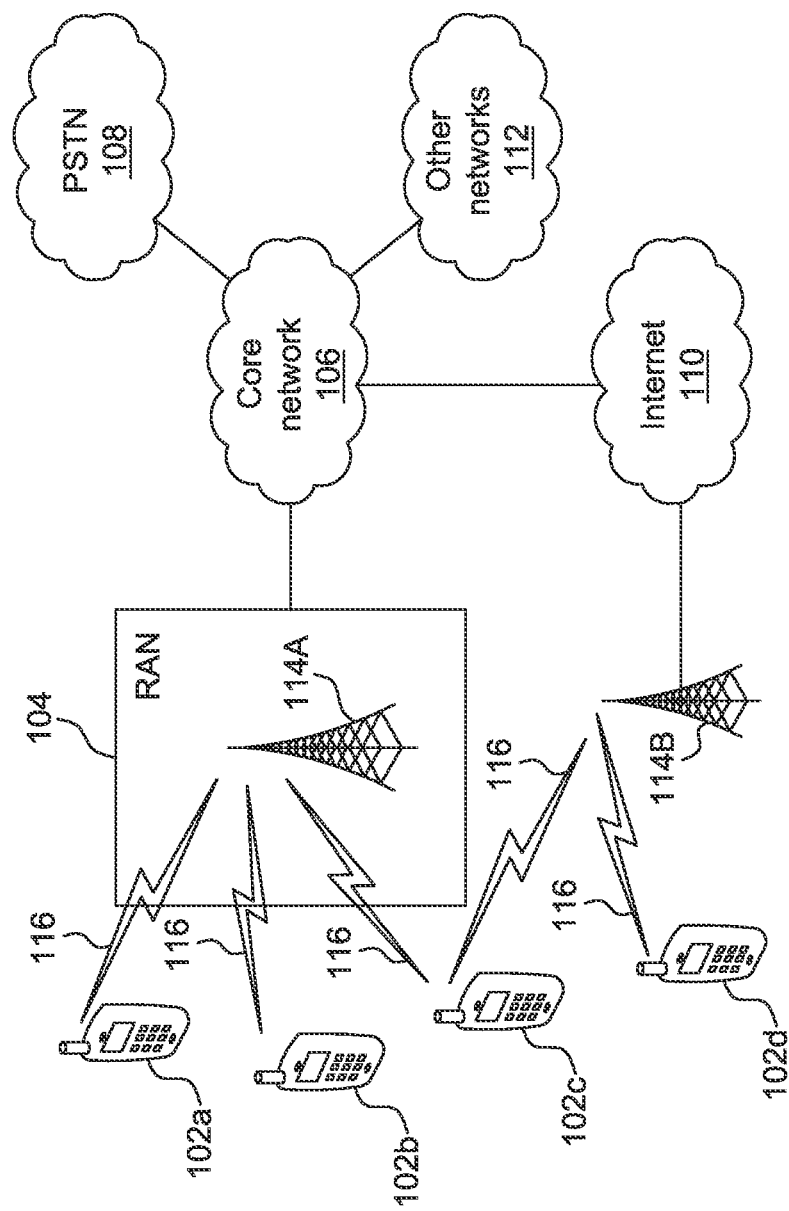
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
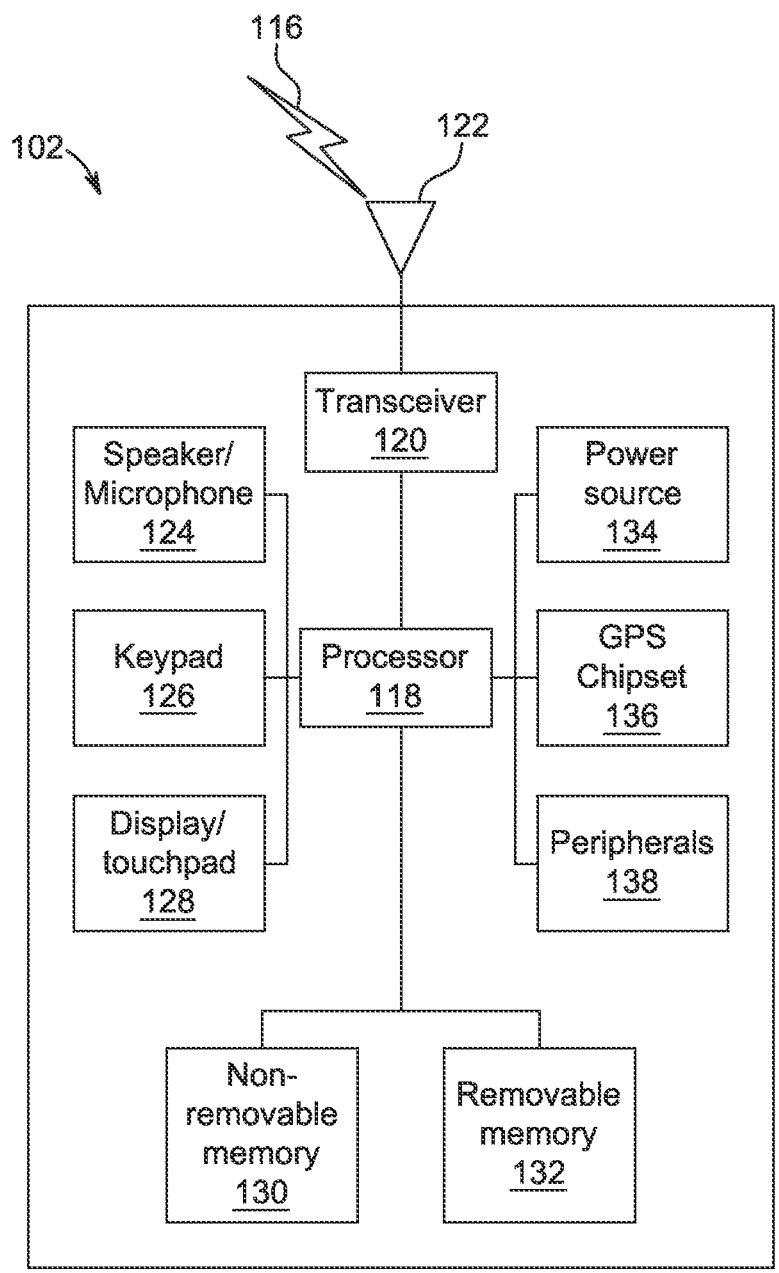
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
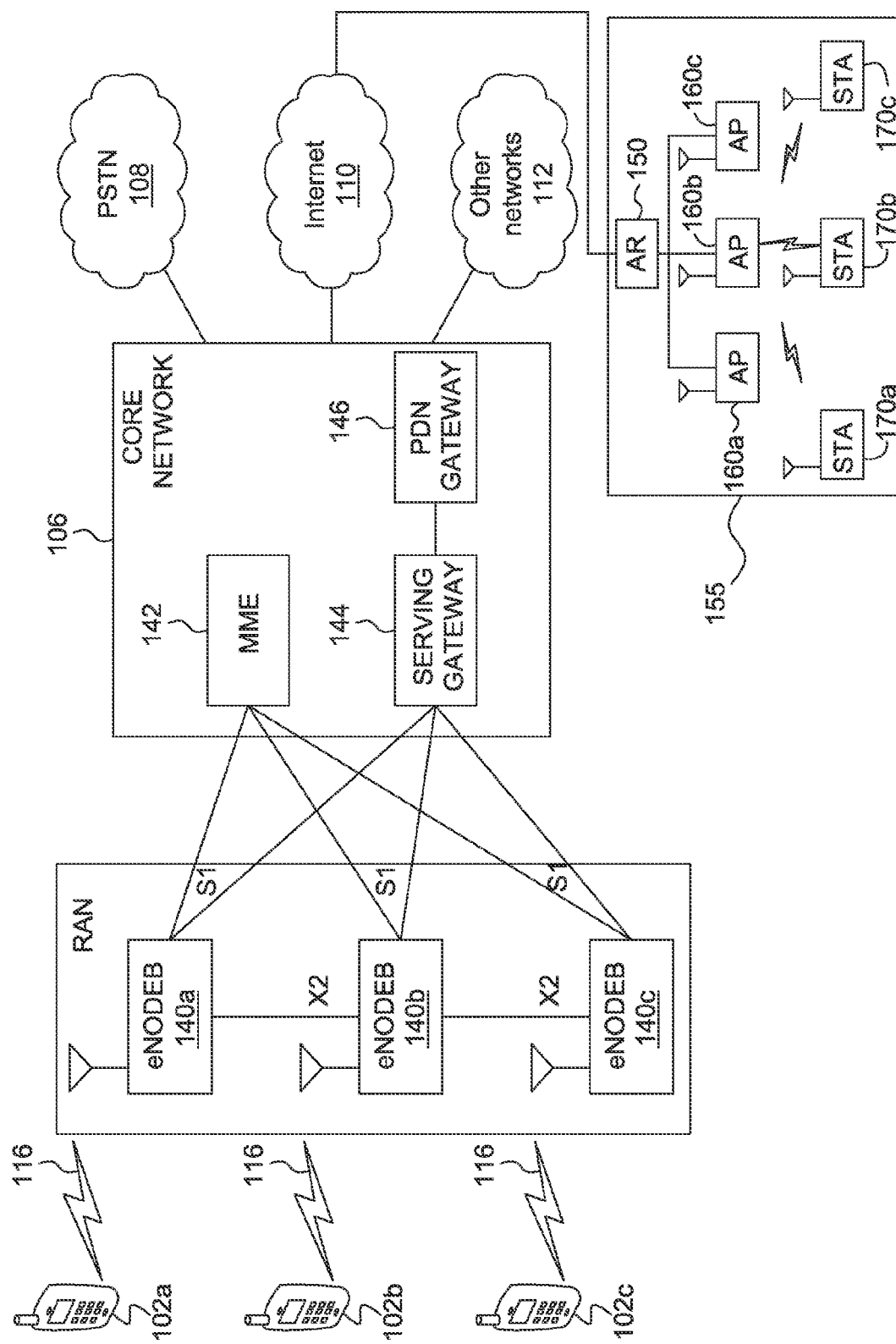
FIG. 1C is a system diagram of an example radio access network and an example core network that may be used within the communications system illustrated in FIG. 1A.

FIG. 1C shows an example RAN 104 and an example core network 106 that may be used within the communications system 100 shown in FIG. 1A. As noted above, the RAN 104 may employ E-UTRA radio technology to communicate with the WTRUs 102a, 102b, 102c over the air interface 116.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Herein, the terminology "STA" includes but is not limited to a wireless transmit/receive unit (WTRU), a user equipment (UE), a mobile station, a fixed or mobile subscriber unit, an AP, a pager, a cellular telephone, a personal digital assistant (PDA), a computer, a mobile Internet device (MID) or any other type of user device capable of operating in a wireless environment. When referred to herein, the terminology "AP" includes but is not limited to a base station, a Node-B, a site controller, or any other type of interfacing device capable of operating in a wireless environment.

Two mechanisms are used for Overlapping Basic Service Set (OBSS) coordination in the IEEE 802.11aa standard, namely, QLoad reports and hybrid coordination function (HCF) controlled channel access (HCCA) transmission opportunity (TXOP) negotiation. A short overview is provided for each mechanism. APs may use QLoad reports from all BSSs in the OBSS for channel selection as well as for conducting admission control and scheduling. An AP may include a QLoad Report element in a QLoad Report frame or Protected QLoad Report frame or optionally in a beacon to announce the traffic load of its own BSS as well as that of other BSSs in the OBSS whose traffic load the AP has obtained. The QLoad Report element is shown in FIG. 2.

The QLoad Report element 200 includes an Element ID field 202 and a Length field 204. Fields such as the Potential Traffic Self field 206, Allocated Traffic Self field 208, and HCCA Peak field 214 indicate the traffic load of the current BSS, while the Allocated Traffic Shared field 210, EDCA Access Factor field 212, and HCCA Access Factor field 216 indicate the traffic load of the entire OBSS. The Overlap field 218 indicates the number of other APs that may be sharing the same channel, whose beacons have been detected or obtained.

The Potential Traffic Self field 206, Allocated Traffic Self field 208, and Allocated Traffic Shared field 210 use the QLoad field format 300 shown in FIG. 3. The mean and standard deviation of traffic load are indicated in the Mean field 302 and Standard Deviation field 304, respectively, and are reported in units of 32 µs. The number of traffic streams that use an active admission control for the access categories AC_VO is indicated in the AC_VO Streams field 306, and the number of traffic streams that use an active admission control for the access categories AC_VI is indicated in the AC_VI Streams field 308. The AP may also request associated STAs that are capable of a sending a Beacon Request message to report QLoad reports from other APs on the same primary channel, or on other channels.

For HCCA TXOP negotiation, HCCA APs may cooperatively create new HCCA schedules with other HCCA APs that are collaboration candidates. Collaboration candidates are defined to be HCCA APs in an OBSS that are able to directly exchange frames without the use of a third-party STA. Each time a traffic stream with an HCCA or HCCA EDCA Mixed Mode (HEMM) access policy is created or deleted, an HCCA TXOP Update Count element may be included in a Beacon frame to indicate that an HCCA TXOP schedule has changed.

An HCCA AP that is capable of TXOP negotiation is able to maintain one or more dot11APCEntry(s) for each collaboration candidate in the dot11APCTable that indicate the schedules that the AP should try to avoid using when creating schedules for new traffic stream requests. When the AP receives a new Traffic Specification (TSPEC) request that has an Access Policy equal to "HCCA" or "HEMM," the AP's Hybrid Coordinated Function (HCF) may first examine all dot11APCEntry(s) that are present in the dot11APCTable. The AP may then send a (Protected) HCCA TXOP advertisement to each collaboration candidate with a proposed TXOP reservation schedule.

Each collaboration candidate may examine its own scheduled TXOP as well as any proposed TXOP schedules that are currently being scheduled and determine whether there are any conflicts. If the received proposed TXOP does not conflict with any existing or in-progress TXOP schedule, the collaboration candidate may send a (Protected) HCCA TXOP Response frame with the status field set to "SUCCESS." If the received proposed TXOP schedule conflicts with a scheduled TXOP, the collaboration candidate may send a (Protected) HCCA TXOP Response frame with the status "TS_SCHEDULE_CONFLICT" with an alternative schedule that does not conflict with any existing TXOP schedule at the collaboration candidate. If the received proposed TXOP schedule conflicts with any in-progress TXOP schedule, the collaboration candidate may determine based on the APs' MAC addresses which proposed TXOP schedule should take precedence. In addition, the collaboration candidate may send a (Protected) HCCA TXOP Response frame with the status "TS_SCHEDULE_CONFLICT" with an alternative TXOP schedule or Avoidance Request.

An HCCA AP may not send an ADDTS Response frame to the requesting STA until it is reasonably certain that the proposed TXOP schedule for the TS is not in conflict with other TXOPs scheduled at collaboration candidates. For example, the HCCA AP may send the ADDTS Response frame when it has received an HCCA TXOP Response frame with the status "SUCCESS" from all of the APs to which the HCCA TXOP advertisements were sent.

Sectorized transmission has been discussed in IEEE 802.11ad. In IEEE 802.11ad, all STAs and APs are assumed to conduct sectorized beam transmissions. A beamformed TXOP may be reserved by transmitting beamformed Request to Send (RTS) and/or directional multi-gigabit (DMG) Clear to Send (CTS) frames. STAs that receive the RTS/DMG CTS frames may obey their network allocation vectors (NAVs). A recipient DMG STA which receives a valid RTS from a source STA during a Service Period (SP) may also transmit a DMG Denial to Send (DTS) to direct the source STA to postpone transmissions if one of the NAV timers at the recipient STA is non-zero.

A personal basic service set (PBSS) control point (PCP) may request a pair of STAs that intend to conduct directional transmissions to each other to conduct measurements while another pair of STAs is actively transmitting directionally. Subsequently, the PCP may request the second pair of STAs to conduct directional measurements while the first pair of STAs transmits directionally to each other. If both pairs of STAs report no or little interference from each other's transmissions, the two pairs of STAs may be scheduled in the same SP to conduct concurrent directional transmissions.

New spectrum is being allocated in various countries around the world for wireless communication systems such as WLANs. Channels allocated in this spectrum are often quite limited in size and bandwidth. In addition, the spectrum may be fragmented in that available channels may not be adjacent, and it may not be possible to combine them to support larger transmission bandwidths. Such is the case, for example, in the spectrum allocated below 1 GHz in various countries. WLAN systems built on the IEEE 802.11 standard, for example, may be designed to operate in such a spectrum. Given the limitations of such a spectrum, the WLANs systems may only be able to support smaller bandwidths and lower data rates compared to HT/VHT WLAN systems based, for example, on the IEEE 802.11n/802.11ac standards.

The IEEE 802.11ah Task Group (TG) was established to develop solutions to support WLAN systems in the sub-1 GHz band. The IEEE 802.11ah TG is targeting to achieve the following requirements: an OFDM Physical (PHY) layer operating below 1 GHz in license—exempt bands excluding television white space (TVWS); enhancements to the Media Access Control (MAC) layer to support the PHY and coexistence with other systems (e.g., IEEE 802.15.4 and IEEE P802.15.4 g); and optimization of rate versus range performance (range up to 1 km (outdoor) and data rates>100 Kbit/s). The following use cases have been adopted by the IEEE 802.11ahTG: Use Case 1: sensors and meters; Use Case 2: backhaul sensor and meter data; and Use Case 3: extended range Wi-Fi for cellular offloading.

The spectrum allocation in some countries is quite limited. For example, in China the 470-566 and 614-787 MHz bands only allow 1 MHz bandwidth. Therefore, there will be a need to support a 1 MHz only option, in addition to a 2 MHz mode. The IEEE 802.11ah PHY is required to support 1, 2, 4, 8, and 16 MHz bandwidths.

The IEEE 802.11ah PHY operates below 1 GHz and is based on the IEEE 802.11ac PHY. To accommodate the narrow bandwidths required by IEEE 802.11ah, the IEEE 802.11ac PHY is down-clocked by a factor of 10. While support for 2, 4, 8, and 16 MHz can be achieved by the 1/10 down-clocking described above, support for the 1 MHz bandwidth requires a new PHY definition with an FFT size of 32.

In IEEE 802.11ah, a key use case defined is meters and sensors, in which up to 6000 STAs may be supported within one single BSS. Devices such as smart meters and sensors have very different requirements pertaining to the supported uplink and downlink traffic. For example, sensors and meters may be configured to periodically upload their data to a server which will most likely be uplink traffic only. Sensors and meters may also be queried or configured by the server. When the server queries or configures a sensor or meter, it may expect the queried data to arrive within a setup interval. Similarly, the server or application may expect a confirmation for any configuration performed within a certain interval. These types of traffic patterns may be very different than the traditional traffic patterns assumed for WLAN systems.

In the IEEE 802.11ah Signal (SIG) field of the Physical Layer Convergence Protocol (PLCP) preamble of a packet, two bits are used to indicate the type of acknowledgment expected as a response (i.e., an Early Acknowledgement (ACK) indication) to the packet. The two bit acknowledgement ACK indication (00: ACK; 01: Block ACK (BA); 10: No ACK; 11: a frame that is not ACK, BA, or CTS) is signaled in the SIG field.

The following views of sectorization operations have been discussed in the IEEE 802.11ah TG. An IEEE 802.11ah AP may conduct sectorized transmissions, while an IEEE 802.11 non-AP may conduct omni-directional transmissions. Sectorization for hidden node mitigation, or Type 0 sectorization, is shown in FIG. 4. An AP may divide the space into which is transmits into multiple sectors. The AP may use a time-division multiplexing (TDM) approach to allow STA transmissions in one sector at the time. STAs may transmit and receive data only in the time interval corresponding with their sector. For example, referring to FIG. 4, the AP may transmit a beacon 400 in sector 1, and then STAs in sector 1 may transmit and receive data during the Sector 1 Interval 402. Similarly, the AP may transmit beacons 404, 408 in sectors 2 and 3, respectively. Each of the beacons may be followed by a respective Sector Interval 406, 410. The AP may also transmit an omni-directional beacon 412. Some intervals, such as the BSS Interval 414 in FIG. 4, may be used for channel access by STAs in all sectors.

In sectorized beam operation, or Type 1 sectorization, an AP may both transmit and receive using omni and sectorized beams. The AP may switch back and forth between sectorized beams and omni beam. A sectorized beam may only be used when the AP is aware of a STA's best sector, or in a scheduled transmission such as a restricted access window (RAW) or during a TXOP of a STA. The AP may switch back to an omni beam otherwise. A sectorized transmit beam may be used in conjunction with a sectorized receive beam. An AP may associate a STA with a specific group (all STAs in the group having a same sector or group ID) based on the STA's best sector.

Figure 5:
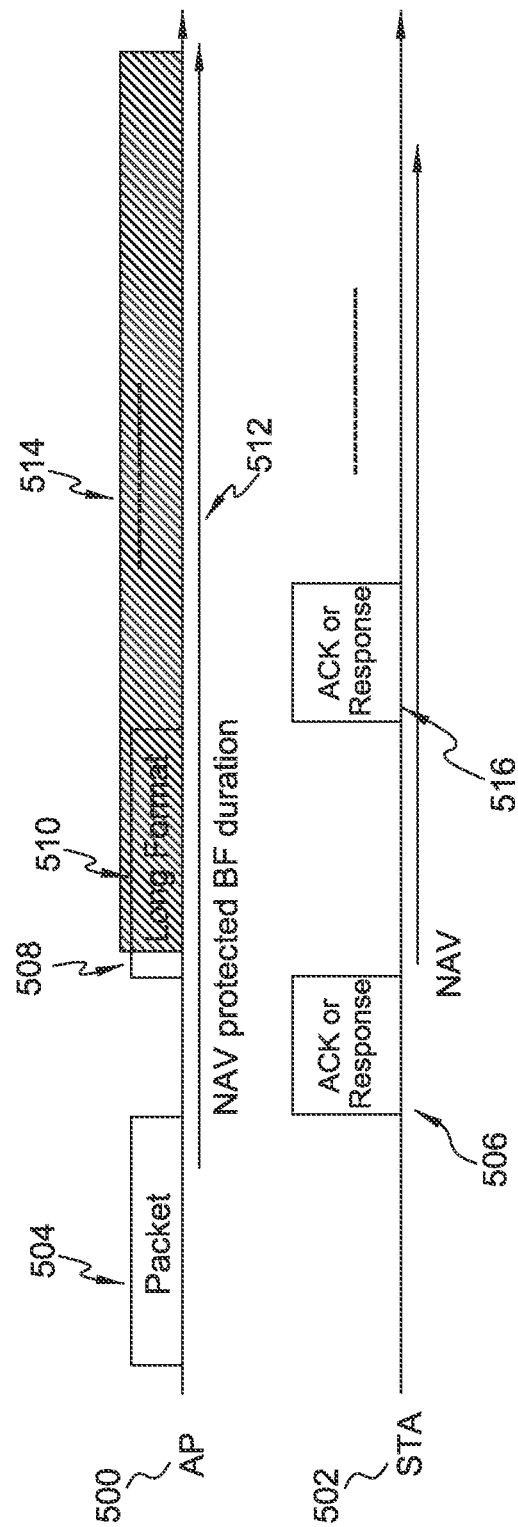
FIG. 5 is an illustration of Spatially Orthogonal (SO) frame exchange sequence 1.

Four types of frame exchange sequences which can lead to Spatially Orthogonal (SO) conditions for Type 1 sectorized operations are described. In SO frame exchange sequence 1, illustrated in FIG. 5, the AP 500 may transmit an omni-directional packet 504 to establish a link with a STA 502 and set up TXOP protection 512 for the duration of the sectorized beam transmission. The AP may then transmit an omni-preamble 508 of a PPDU with long format, and a beamformed preamble 510 of the PPDU with long format. The AP may continue to transmit using sectorized transmissions (with Greenfield beamforming (BF)) for the remainder of the TXOP, as indicated by the shaded region 514. The omni-directional packet 504 may include an ACK Indication or ACK Policy that indicates that an acknowledgement is expected, for example, an ACK Indication=00, ACK Indication=10, and ACK Indication=11/ACK Policy=00. The receiving STA 502 may send an ACK or other response frame 506 in response to the omni-directional packet 504. The STA 502 may send an ACK 516 to acknowledge the long format packet 508, 510.

The SO condition is met when an OBSS STA or AP does not receive the ACK or Response transmission 506 from the STA 502, and also does not receive the sectorized transmission portion 510 of the long format packet from the AP 500. Accordingly, the duration of the sectorized TXOP 512 may be spatially reused by spatially orthogonal OBSS STAs and APs. An OBSS STA or AP may infer its spatial orthogonality with the AP 500 by receiving the omni-directional packet 504 and the omni-preamble 508 of the long format packet, but not the beamformed preamble 510 of the long format packet. An OBSS STA or AP may infer its spatial orthogonality with the STA 502 by receiving no transmission between the omni-directional packet 504 and the omni-preamble 508 of the long format packet.

Figure 6:
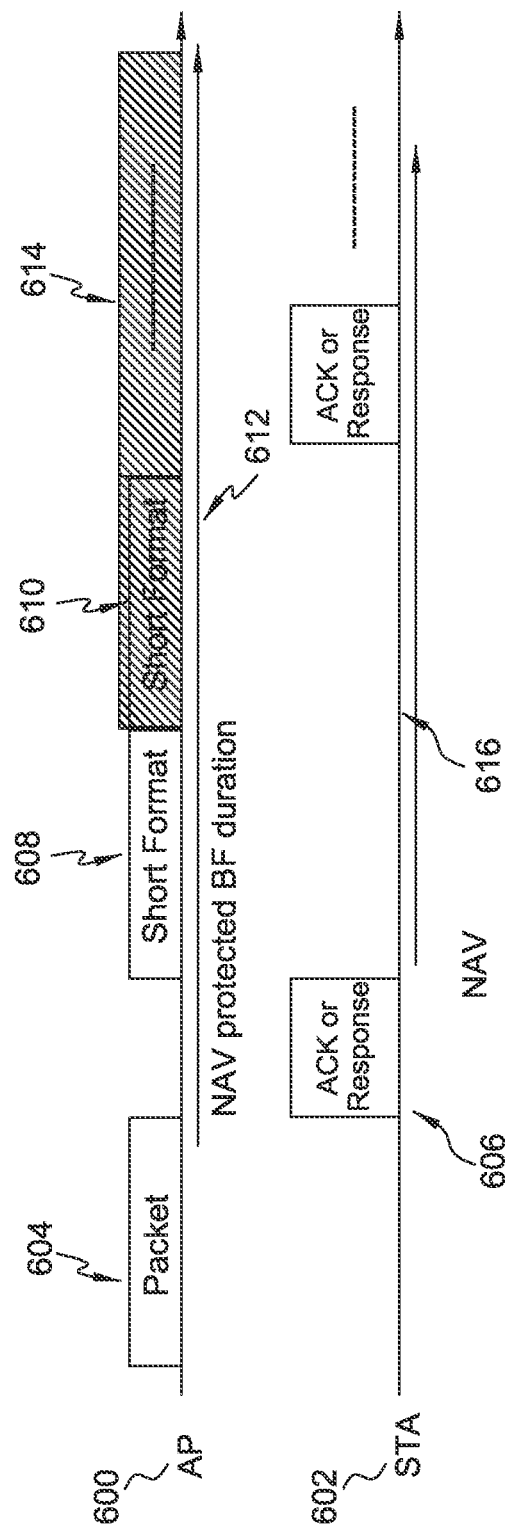
FIG. 6 is an illustration of SO frame exchange sequence 2.

In SO frame exchange sequence 2, illustrated in FIG. 6, an AP 600 may transmit an omni-directional packet 604 to establish a link with a STA 602 and to set up the protection 612 for the duration of the sectorized beam transmission. The omni-directional packet 604 may include an ACK Indication or ACK Policy that indicates that an acknowledgement is expected, for example, an ACK Indication=00, ACK Indication=10, and ACK Indication=11/ACK Policy=00. The STA 602 may send an ACK or other response frame 606 in response to the omni-directional packet 604. The AP 600 may then transmit an omni-directional short format packet, and subsequently a sectorized transmission (with Greenfield BF) may be used to transmit a sectorized short format packet 610. A sectorized beam may be used for the remainder of the TXOP 612, as indicated by the shaded region 614.

The SO condition is met when an OBSS STA/AP does not receive the STA's transmission 606, and also does not receive the AP's sectorized transmissions during the remainder of the TXOP 612 following the omni-directional packet of the short format 608. Accordingly, the duration of the sectorized TXOP 612 may be spatially reused by spatially orthogonal OBSS STAs and APs. An OBSS STA or AP may infer its orthogonality with the AP 600 by receiving the omni-directional packet 604 and omni-directional packet of the short format 608, but not the beamformed short format packet 610. An OBSS STA or AP may infer its orthogonality with the STA 602 by receiving no transmission between the omni-directional packet 604 and the omni-directional packet of the short format 608.

Figure 7:
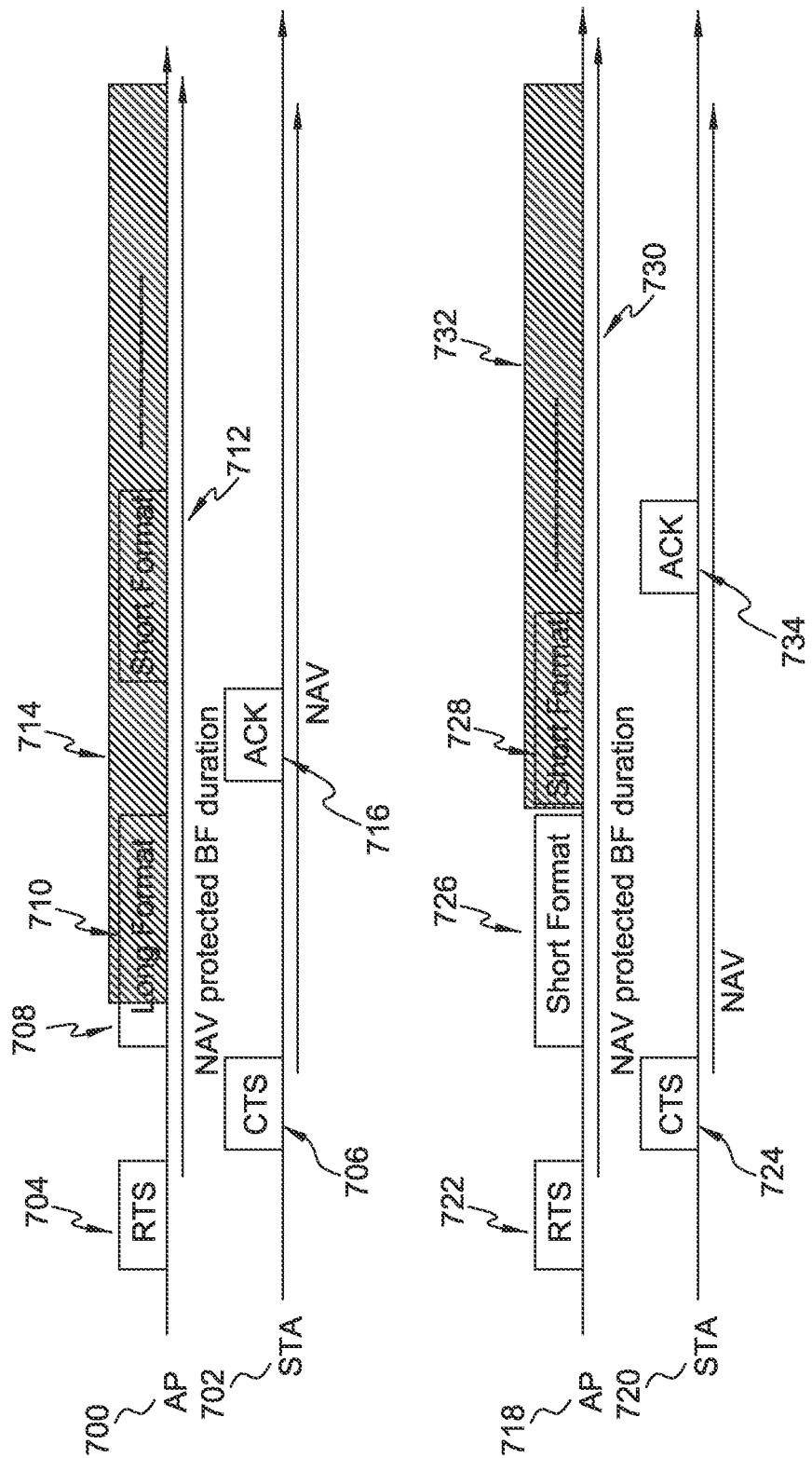
FIG. 7 is an illustration of SO frame exchange sequence 3.

In SO frame exchange sequence 3, depicted in FIG. 7, an AP 700 may start a frame exchange with an omni-transmission RTS 704 to solicit a CTS response 706 from a STA 702. As shown in FIG. 7, the AP 700 may then transmit an omni-directional preamble 708 of a long format packet. The AP 700 may then switch to sectorized beam transmission for the remainder 710 of the long format packet, and for the remainder of the protected duration 712. The shading 714 indicates the use of a sectorized beam. The STA 702 may send an ACK 716 acknowledging the long format packet 708, 710.

The SO condition is met when an OBSS STA or AP observes the omni-transmission 708 of the AP 700 but not the beamformed transmission 710 of the AP 700, or the STA's transmissions 706, 716. An OBSS STA or AP may infer its spatial orthogonality with the AP 700 by observing the omni-transmission RTS packet 704 and the omni-preamble 708 of the long format, but not the sectorized remainder 710 of the long format packet. An OBSS STA or AP may infer its spatial orthogonality with the STA 702 by observing a gap of no transmission between the omni-transmission RTS packet 704 and the omni-preamble 708 of the long format packet.

In a variation of SO frame exchange sequence 3, also depicted in FIG. 7, an AP 718 may start a frame exchange with an omni-transmission RTS 722 to solicit a CTS response 724 from a STA 720. The AP 718 may then transmit an omni-directional short format packet 726. The AP 718 may then switch to sectorized beam transmission to transmit a second short format packet 728, and may continue with sectorized transmission for the remainder of the protected duration 730. The shading 732 indicates the use of a sectorized beam. The STA 720 may send an ACK 734.

The SO condition is met when an OBSS STA or AP observes the omni-transmission 726 but not the sectorized short format packet 728, nor the STA1's transmissions 724, 734. An OBSS STA or AP may infer its spatial orthogonality with the AP 718 by observing the omni-transmission RTS packet 722 and the omni-transmission short format packet 726, but not the sectorized short format packet 728. An OBSS STA or AP may infer its spatial orthogonality with the STA 720 by observing a gap of no transmission between the omni-transmission RTS 722 and the omni-transmission short format packet 726.

Figure 8:
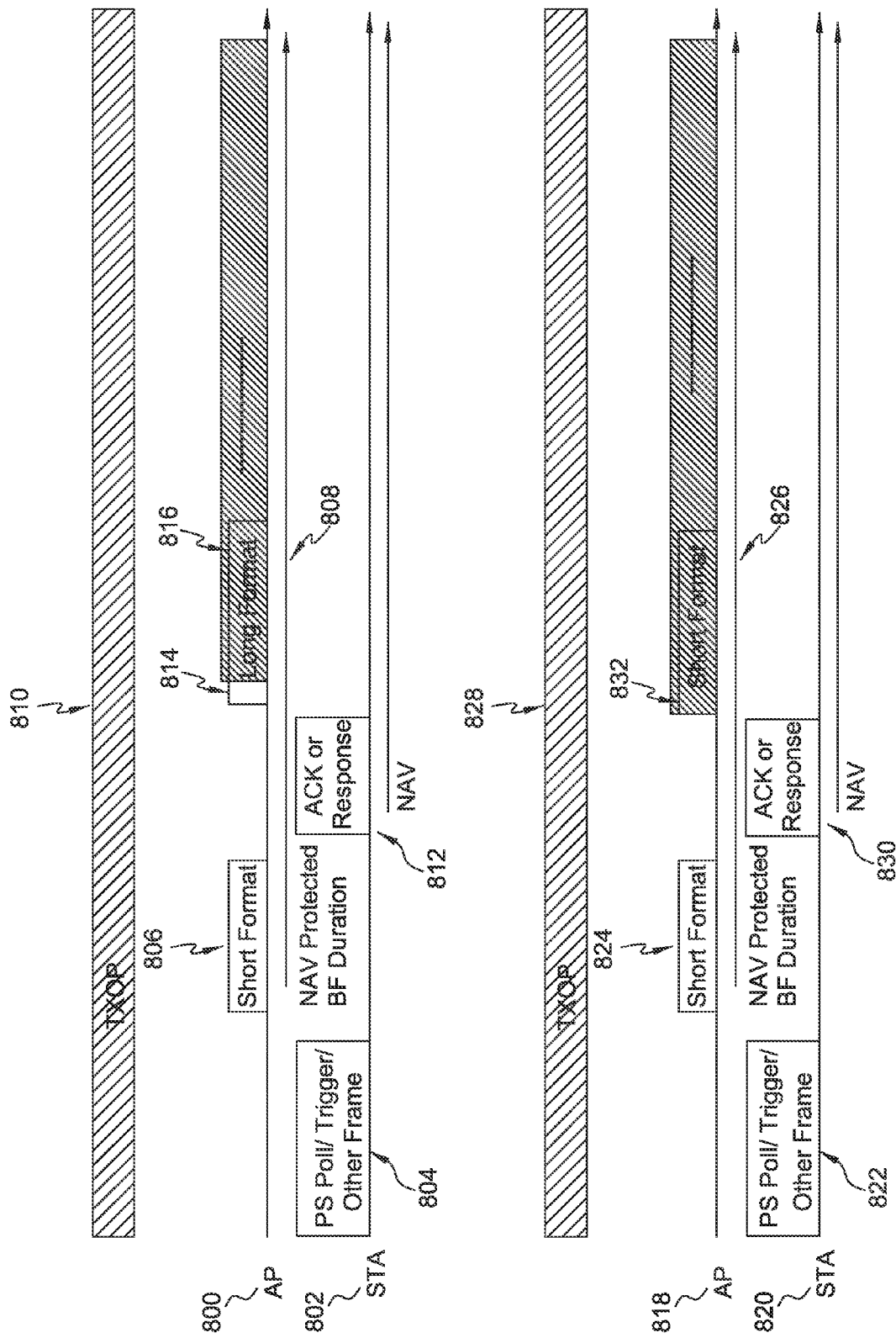
FIG. 8 is an illustration of SO frame exchange sequence 4.

In SO frame exchange sequence 4, illustrated in FIG. 8, a STA 802 transmits a PS-Poll, trigger, or other frame 804 to establish a link with an AP 800. The AP 800 responds with an omni-transmission short format packet 806 that establishes protection 808 for the remaining duration of the TXOP 810. The STA 802 may transmit an ACK or response 812 to acknowledge the short format packet 806. The AP 800 may transmit an omni-preamble 814 of a long format packet and then switch to sectorized beam transmission for the remainder 816 of the long format packet, and the remainder of the protected duration 808.

The SO condition is met when an OBSS STA or AP receives an omni-transmission 806, 814 from the AP 800, but does not receive the sectorized transmission 816 from the AP 800, or the STA's transmissions 804, 812. An OBSS STA or AP may infer its spatial orthogonality with the AP 800 by observing the omni-preamble 814 of the long format packet but not the sectorized transmission of the remainder 816 of the packet. An OBSS STA or AP may infer its spatial orthogonality with the STA 802 by observing a gap of no transmission between the omni-transmission short format packet 806 and the sectorized omni-preamble 814.

In a variation of SO frame exchange sequence 4, also shown in FIG. 8, a STA 820 transmits a PS-Poll, trigger, or other frame 822 to establish a link with an AP 818. The AP 818 responds with an omni-transmission short format packet 824 that sets up protection 826 for the remaining duration of the TXOP 828. The STA 820 may transmit an ACK or response 830 to acknowledge the short format packet 824. The AP 818 may switch to sectorized beam transmission to transmit a sectorized short format packet 832, and may continue with sectorized transmission for the remainder of the protected duration 826.

The SO condition is met when an OBSS STA or AP receives the omni-transmission 824 from the AP 818, but does not receive the sectorized transmission 832 from the AP 818, or the STA's transmissions 822, 830. An OBSS STA or AP may infer its spatial orthogonality with the AP 818 by observing the omni-transmission short format packet 824, but not the sectorized transmission of the second short format packet 832. An OBSS STA or AP may infer its spatial orthogonality with the STA 820 by observing a gap of no transmission between the omni-transmission short format packet 824 and the sectorized transmission short format packet 830.

Figure 9:
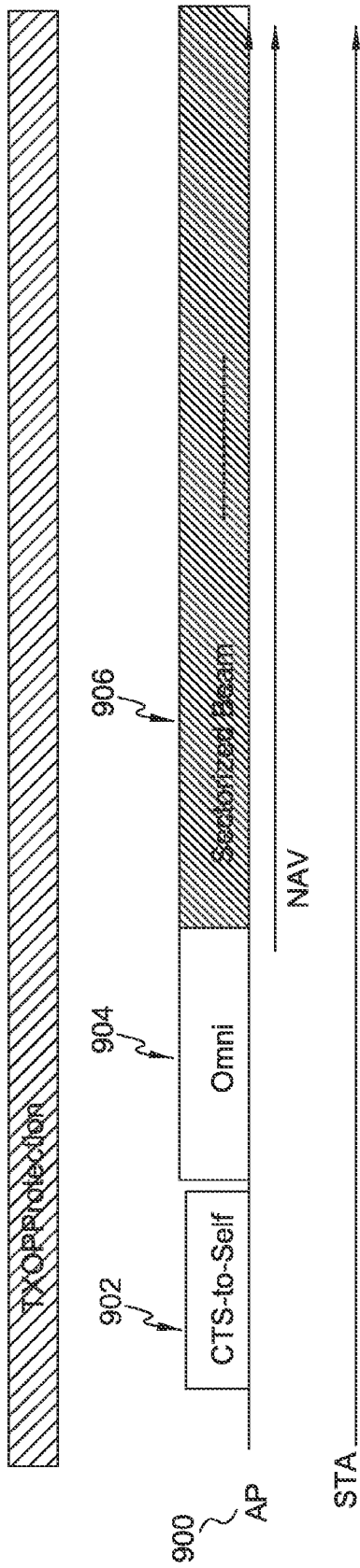
FIG. 9 shows how a CTS-to-self may facilitate the detection of the SO conditions.
Figure 10:
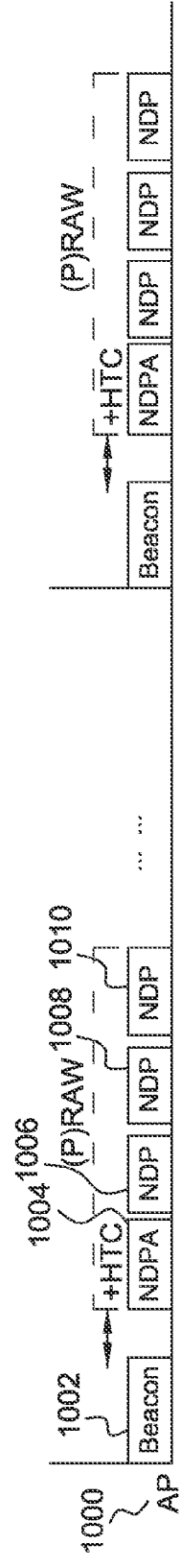
FIG. 10 illustrates periodic sector training.

Information Elements for Type 0 and Type 1 Sectorization may be defined. Referring to FIG. 9, an AP 900 may include a 1-bit Sector ID indicator in a CTS-to-Self 902 (which may precede SO frame exchange sequences 1 or 2) to facilitate the detection of the SO conditions. The omni-transmission 904 and sectorized transmission 906 may proceed as described above for SO frame exchange sequences 1 and 2. Sounding and Sector ID feedback signaling and procedures may also be implemented. As an example, FIG. 10 illustrates periodic sector training. An AP 1000 may transmit a beacon 1002 that includes a schedule for sector training. The AP 1000 may transmit a null data packet (NDP) announcement (NDPA) frame 1004 followed by a number of NDP frames 1006-1010. STAs may listen to the NDP frames 1006-1010 and send feedback to the AP 1000. This procedure may be repeated periodically.

In current designs, omni-directional packets may be used to reserve a TXOP for directional or sectorized transmissions. For example, a sectorized TXOP during which sectorized transmissions are being conducted may be reserved by omni-directionally transmitted frames or partial frames, e.g., in SO Conditions 1-4. Examples of such omni-directionally transmitted frames or partial frames include the following: omni-directional packets, such as RTS, CTS, etc.; omni-directional short packets, such as NDP frames; and an omni-portion of a packet, such as an omni-directional portion of a PLCP header followed by a sectorized transmission portion of a packet. However, recipients of the omni-directional packets may not be aware that the reserved TXOP is meant for sectorized transmissions. A procedure is needed for providing an effective indication of a sectorized TXOP.

When APs in an OBSS or neighboring BSS transmit using sectorized transmissions, the sectorized transmissions may interfere with sectorized and omni-directional transmissions in the OBSS. A procedure is needed for coordinating sectorized and omni-directional transmissions between APs and BSSs in order to provide optimal performance in an OBSS and neighboring BSSs.

Figure 11:
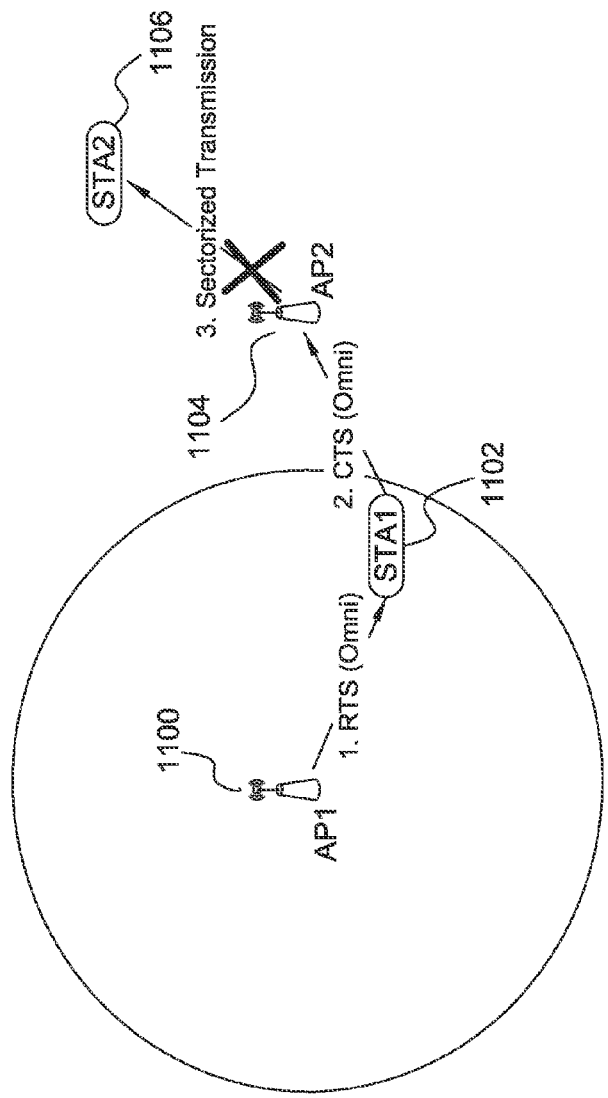
FIG. 11 shows an example scenario in which sectorized transmissions of Request to Send (RTS)/Clear to Send (CTS) messages block an AP's transmission.

The current Spatially Orthogonal conditions that allow OBSS STAs and APs to conduct concurrent sectorized operations are not optimal. They may potentially unnecessarily disallow neighboring BSSs to conduct transmissions. This is illustrated in FIG. 11. AP1 1100 and STA1 1102 may use omni-directional packets to reserve a sectorized TXOP for transmissions from AP1 1100 to STA1 1102. AP2 1104 may not be allowed to conduct any transmissions if it receives an omni-directional CTS from STA1 1102 although a sectorized transmission from AP2 1104 to STA2 1106 would not impact the ongoing sectorized transmissions from AP1 1100 to STA1 1102. An improvement of the NAV setting in relation to the defined SO conditions is needed to optimize network throughput and performance.

Some STAs may be mobile and may change their location during the time of association of an AP. In addition, channel conditions may change between a STA and its AP. Consequently, a STA's sector in a BSS may change from time to time. A procedure is needed for providing fast sector feedback in an effective and efficient manner without much overhead.

Embodiments described herein address the issues identified above. As shown in FIGS. 5-8, omni-directional packets (ODP), omni-directional short packets (ODSP) and the omni-directional portion of Hybrid Mode Packets (HMPs, or packets that are transmitted partially using an omni-directional mode and partially using a sectorized beamformed mode) may be used to reserve a sectorized TXOP. These ODPs, ODSPs, or omni-directional portion of the HMPs may contain indications that that they are used to reserve a sectorized TXOP.

Figure 12:
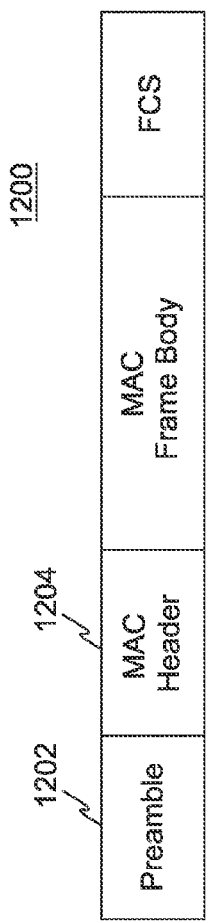
FIG. 12 illustrates how a Sectorized Transmission indication, Sectorized Transmission Opportunity (TXOP) indication, and Sector ID indication may be included in a preamble or Media Access Control (MAC) header of a packet.

Referring to FIG. 12, one or more bits may be used in the preamble 1202 or the MAC header 1204 of a packet 1200 to indicate whether the frame exchanges are meant to reserve a sectorized TXOP. Alternatively or additionally, one or more bits may be used in the preamble 1202 or MAC header 1204 of a packet 1200 to indicate the Sector ID associated with the sectorized TXOP. For example, the ODPs, such as RTS/CTS or newly defined packets, or ODSPs, such as short RTS/CTS, or the omni-directional portions of the HMPs, may contain a one bit indicator that indicates that they are being used to reserve a sectorized TXOP. When an AP intends to transmit using Type 1 sectorization, it may send a RTS (or any other type of omni-directional frame or short frame) with a Sectorized TXOP indication in the preamble or MAC header. The Sectorized TXOP indication may also imply that the same omni-directional packet contains a Sector ID indication in the preamble or MAC header. The term preamble is used herein to indicate the collection of PHY related fields in a PPDU that are transmitted before the MAC header, which may include the preamble, the PLCP preamble, and the PLCP header. In such a case, the receiving STA may decode the preamble or MAC header to receive the indication of the Sector ID for which the sectorized TXOP is being reserved. Alternatively, the RTS may only contain a Sectorized TXOP indication and no Sector ID indication. The Sector ID may be determined by the receiving STA based on the intended receiver STA's sector as determined by sectorization training and feedback.

When the intended receiving STA decodes the RTS frame with a Sectorized TXOP indication, it may reply using an omni-directional CTS frame with a Sectorized TXOP indication. If the RTS frame also contains a Sector ID, the receiving STA may copy the Sector ID from the RTS frame. In an another example, if the RTS frame only contains the Sectorized TXOP indication, the receiving STA may respond with a CTS frame with a Sectorized TXOP indication as well as the Sector ID indication. The Sector ID may have been obtained by the receiving STA from sectorization training and feedback procedures.

In another embodiment, the Sectorized TXOP indication and the Sector ID indication may be combined into one field. For example, the combined Sectorized TXOP indication and Sector ID indication field may consist of any number of bits, such as two or three bits in a preamble or MAC header. One of the bit patterns, for example, "00" for a two bit indication field, or "000" for a three bit indication field, may be used to indicate that the packet carrying the combined indication is used to reserve a TXOP for omni-directional transmissions. The bit patterns in the indication field that are not all zeros may be used to indicate the Sector ID for which a sectorized TXOP is being reserved.

In another example or in addition to the above, one or more bits may be used in the preamble or MAC header to indicate that the current transmission is part of a sectorized transmission. This indication is referred to herein as a Sectorized Transmission indication. For example, in an HMP, the omni-directional preamble may carry a one bit Sectorized Transmission indication that indicates that the remaining packet will be transmitted using a sectorized beam. Any response frame, such as an ACK or CTS, though transmitted omni-directionally, may also carry the Sectorized Transmission indication since it is part of the sectorized transmission packet exchange.

In another embodiment, the Sectorized Transmission indication and the Sector ID indication may be combined into one field. For example, the combined Sectorized Transmission and Sector ID field may consist of any number of bits, such as two or three bits in the preamble or MAC header. One of the bit patterns, for example "00" for a two bit indication field, or "000" for a three bit indication field, may be used to indicate that the packet carrying the combined indication is transmitted using an omni-directional antenna pattern. The bit patterns in the indication field that are not all zeros may be used to indicate the ID of the sector in which the sectorized transmission is taking place.

Although in this section RTS and CTS frames are used as examples, it is understood that the indications and procedures apply to all types of omni-directional/directional frames, omni-directional/directional short frames, and omni-directional/directional portions of HMPs that are used to reserve a sectorized TXOP. It is further understood that all indications may be implemented as part of new or existing fields or subfields in the preamble or MAC header, such as the SIG field, SIGA field, SIGB field, Frame Control field, Sequence field, Duration field, Association ID (AID) field, etc.

To facilitate coordination of sectorized and omni-directional transmissions in overlapping and neighboring networks, STAs and APs may provide indications that they are capable of conducting inter-AP/inter-BSS sectorized transmission training, feedback, and coordination. This may be done using the OBSS Capability information element (IE) 1300 shown in FIG. 13. The OBSS Capability IE may contain the following fields: an Element ID field 1302 that identifies the information element as an OBSS Capability IE; a length field 1304 that indicates the length of the OBSS Capability IE; an Explicit Sectorized Training field 1306 that indicates that the transmitting STA is capable of performing explicit sectorized training procedures; and an Implicit Sectorized Training field 1308 that indicates that the transmitting STA is capable of performing implicit sectorized training procedures. The STA may include a "1," for example, in the Explicit Training field and/or Implicit Training field to indicate that it is capable of performing explicit and/or implicit training procedures, respectively.

The OBSS Capability IE may further include an OBSS Sectorization Feedback Option field 1310. This field may indicate the options for OBSS Sectorization Feedback, which may include the following: Feedback Directly to OBSS AP may indicate that the transmitting STA or AP may provide feedback directly to the OBSS AP after OBSS sectorized transmission training; Feedback to Own AP may indicate that the transmitting STA, for example, a STA that is already associated with an AP, may provide feedback directly to its own AP after OBSS sectorized transmission training; and Feedback to a Coordinating AP may indicate that the transmitting STA, for example, an AP or a STA that is associated with its own AP, may provide feedback to a coordinating node, such as an AP in charge of coordinating an OBSS, after OBSS sectorized transmission training.

A Feedback Options subfield of the OBSS Sectorization Feedback Option field 1310 may specify the various options that the transmitting STA is capable of performing for providing OBSS sectorized training feedback. The options may include Scheduled, Contention Based, Wireless, Wired, and Multiband subfields. The Scheduled subfield may indicate whether the transmitting STA may provide feedback according to a schedule, such as a RAW, a Periodic RAW (PRAW), an automatic power save delivery (ASPD), or a power save multi-poll (PSMP) slot. The Contention Based subfield may indicate whether the transmitting STA may provide feedback using a contention based method, which may take place in a given beacon interval or subinterval. The Wireless subfield may indicate whether the transmitting STA may provide feedback over a wireless interface, such as the same or a separate IEEE 802.11 interface. The Wired subfield may indicate whether the transmitting STA may provide feedback over a wired interface, such as a wired Ethernet connection. The Multiband subfield may indicate whether the transmitting STA may provide feedback using an interface on a separate frequency band, such as an IEEE 802.11ad, 802.11aj, or 802.11ac interface.

The OBSS Capability IE 1300 may further include an OBSS Sectorized Coordination field 1312. The OBSS Sectorized Coordination field 1312 may indicate a number of capabilities, including Capable of Receiving OBSS STA Feedback, Capable of Receiving Peer AP Feedback, Capable of Receiving OBSS Feedback from Associated STAs; and Capable of Coordinating AP. Capable of Receiving OBSS STA Feedback may indicate that the transmitting STA, such as an AP, is capable of receiving sectorized transmission training feedback directly from an OBSS STA. Capable of Receiving Peer AP Feedback may indicate that the transmitting STA, such as an AP, is capable of receiving sectorized transmission training feedback directly from peer APs in the OBSS. Capable of Receiving OBSS Feedback from Associated STAs may indicate that the transmitting STA, such as an AP, is capable of receiving OBSS sectorized transmission training feedback from the STAs that are associated with it. Capable of Coordinating AP may indicate that the transmitting STA may serve as a coordinating AP.

The OBSS Sectorized Coordination field 1312 may further indicate a number of sectorization coordination options. Type 0 Sectorization may indicate that the transmitting STA is capable of coordinating Type 0 sectorization across an OBSS. Type 1 Sectorization may indicate that the transmitting STA is capable of coordinating Type 1 sectorization across an OBSS.

The OBSS Sectorized Coordination field 1312 may further include an Options subfield that specifies options for OBSS Sectorized Transmission Coordination. The options may include Distributed, in which the transmitting STA is capable of distributed coordination, and Centralized, in which the transmitting STA performs OBSS sectorized transmission coordination through a coordinating node, such as a coordinating AP.

The OBSS sectorized training, feedback, and coordination capability indication procedure may be as follows. An AP, when transmitting a beacon, short beacon, or any other type of management or control frame, may include the OBSS Capability IE to indicate its capability for OBSS sectorized transmission training, feedback, and coordination. For example, the AP may indicate that it is capable of implicit OBSS sectorized training, capable of providing training feedback directly to an OBSS peer AP, capable of receiving training feedback directly from an OBSS peer AP, and capable of coordinating both Type 0 and Type 1 sectorized transmissions. A second AP, after receiving the beacon from the first AP, may conduct sectorized transmission training, feedback, and coordination with the first AP according to its own capability and the first AP's capabilities as indicated in the beacon.

A STA may include the OBSS Capability IE in frames such as Probe Requests, Association Requests, or any other type of management and control frames. It may indicate that it is capable of providing OBSS sectorized training feedback directly to its AP, provided that the AP is capable of receiving OBSS feedback from its associated STAs. An AP may instruct the STA to report OBSS feedback periodically.

The OBSS Capability IE 1300 or any subset of the fields thereof may be implemented as a subfield or subset of subfields of any existing or new IE, such as the S1G Capability, S1G Extended Capability, Sector Operation, Sector Capability, Type 0 Sectorization Scheme, and Type 1 Sectorization Scheme elements, or as part of any control, management, or extension frames or MAC/PLCP headers.

Signaling and procedures for inter-AP sectorization transmission training and feedback are described herein. Without loss of generality, a generic scenario is considered with two APs to illustrate the proposed procedures. Each AP may have numerous STAs associated with it. As shown in FIG. 14, AP2 1400 may know the location/sectors of its associated STAs, such as STA1 1402, STA2 1404, . . . STAM 1414. Similarly, AP1 1416 may know the location/sectors of the STAs 1418-1428 associated with it.

Two types of OBSS sector training and feedback procedures are proposed, an implicit procedure and an explicit procedure. The implicit OBSS sector training and feedback procedure may be as follows. If AP1 and AP2 are within range of each other, they may detect each other's beacons which may indicate that they are both capable of implicit OBSS sectorized transmission training and feedback. AP1 may start a sector training sounding sequence as normal, as shown in FIG. 10 for intra-BSS sector training. AP2 may also reserve the same period of time as quiet time so that no STAs may transmit during AP1's sector training time.

AP1 may provide a schedule to each of the OBSS APs that has previously indicated that it is capable of OBSS sectorized coordination and capable of providing sector training feedback directly to a peer AP. The schedule may indicate when the OBSS APs should provide their feedback for AP1's sector training. Such a schedule may be a RAW, a PRAW, a beacon interval or subinterval, or an access window. For example, AP1 may instruct AP2 to provide sector training feedback either using contention-free or contention-based access.

Figure 15:
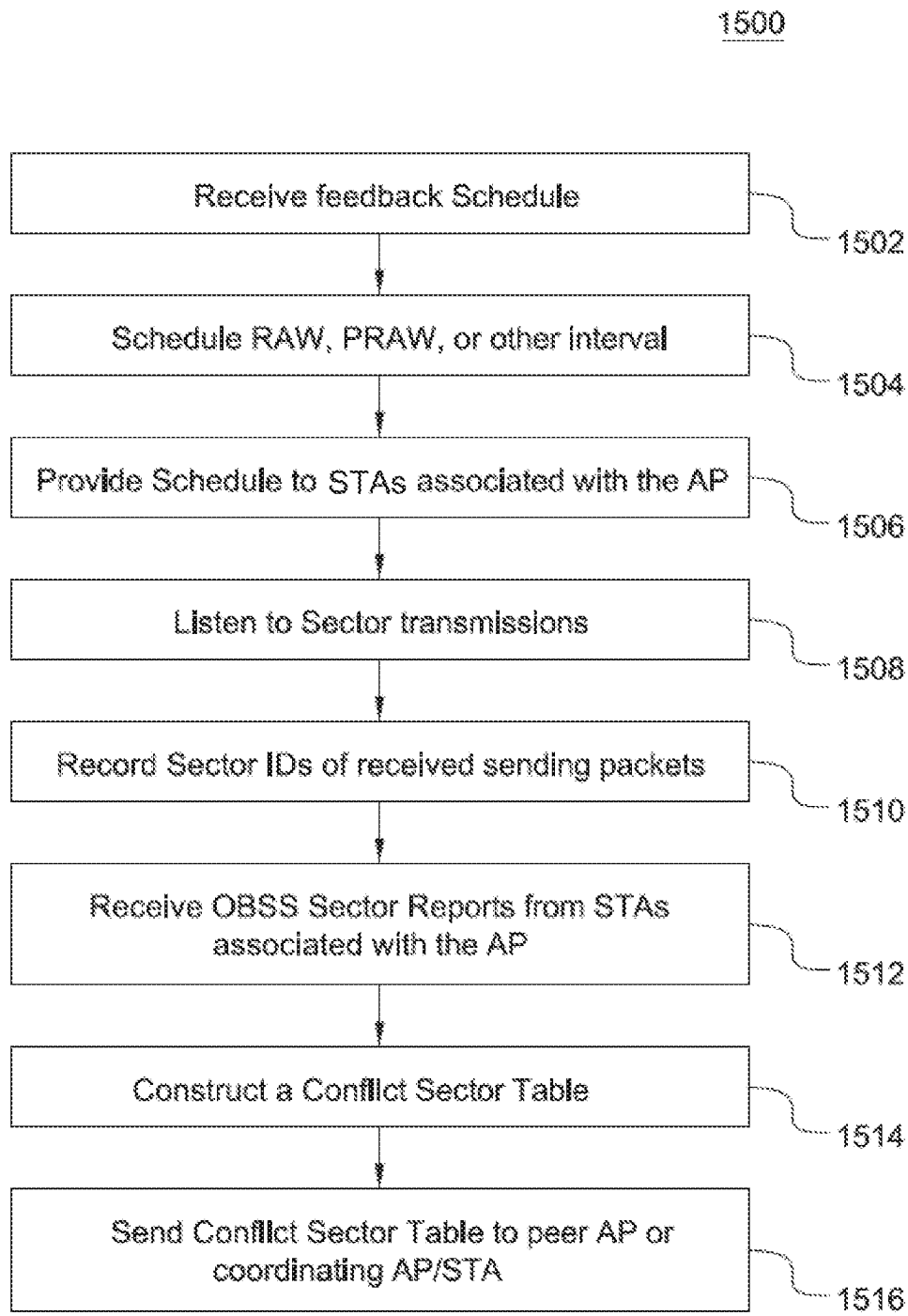
FIG. 15 illustrates an example sectorized training procedure for an AP that receives a sector training feedback schedule from a peer AP.

FIG. 15 illustrates an example sectorized training procedure 1500 for an AP that receives a sector training feedback schedule from a peer AP. AP2, after receiving the assigned sector training feedback schedule or allocated time from AP1 (step 1502), may schedule a RAW, PRAW, or other interval for itself within its own BSS (step 1504). In addition, AP2 may also provide a schedule for STAs in its own BSS that have indicated that they are capable of providing OBSS sector training feedback to their own associated AP (step 1506). AP2 may use the feedback from the STAs to provide OBSS training feedback to AP1.

AP2 may listen to the sector training transmissions from AP1 (step 1508). AP2 may record the Sector IDs of those sounding packets that it receives, identifying each sector as an Interfering Sector (step 1510). STAs that are associated with AP2 may also listen to the sector training transmissions from AP1 and may record the Sector IDs of those sounding packets that they receive, identifying each sector as an Interfering Sector. In addition, AP2 and STAs in BSS2 having received an ODP, ODSP, or omni-directional portion of an HMP that contains a Sector TXOP indication and/or a Sector ID indication, may also record the Sector ID and identify it as an Interfering Sector. The BSSID associated with the Interfering Sector may be obtained from the Receiver Address (RA) or Destination Address (DA) field of the ODP, ODSP, or omni-directional portion of the HMP.

STAs in BSS2 may provide OBSS Sector Reports to AP2 with any Interfering Sectors that they have observed and the BSSID associated with each sector (step 1512). STAs in BSS2 may also provide to AP2 their own Sector ID in BSS2. AP2 may then construct a Conflict Sector Table as shown in Table 1 (step 1514). In Table 1, the column Transmitting BSSID indicates the transmitting OBSS, for example, BSS1; the column Transmitting Sector ID indicates the transmitting Sector in the OBSS, for example, Sector 2 in BSS1; and the column Conflicting Sector IDs in Own BSS indicates those sectors in the AP's own BSS in which interference is experienced due to the sectorized transmissions indicated in the first and second columns. For example, the first row in Table 1 indicates that interference is experienced in sectors 2 and 3 and at AP2 of BSS2 due to the sectorized transmissions in sector 1 of BSS1. A value of "AP" in the Conflict Sector IDs in the Own BSS column may indicate that a sectorized transmission in BSS1, Sector 1 aims directly at AP2 in BSS2. It may suggest that AP2 and Sector 1 in BSS1 should not share any concurrent or overlapping TXOP.

TABLE 1

An example of a Conflict Sector Table

| Transmitting BSSID | Transmitting Sector ID | Conflicting Sector IDs in Own BSS |
|---|---|---|
| BSS1 | 1 | 2, 3, AP |
| BSS1 | 2 | 4 |
| BSS1 | M | 3 |
| . . . | . . . | . . . |
| BSS3 | 3 | 5 |

The implication of the Conflict Sector Table is that there may be no concurrent sectorized transmissions in the Transmitting Sector and Conflicting Sectors in BSS1 and BSS2. In distributed coordination, AP2 may provide the Conflict Sector Table to its peer APs, or it may only provide the relevant part of the Conflict Sector Table to its peer APs (step 1516). AP1 may then enhance its own Conflict Sector Table using the newly received information from AP2. AP1 may then broadcast the Conflict Sector Table to all STAs associated with it so that each STA in BSS1 may know which sectors may be in conflict with which sectors in neighboring BSSs.

In centralized coordination, AP2 may provide the Conflict Sector Table to a coordinating AP/STA. The coordinating AP/STA may have all copies of the Conflict Sector Table from all APs in the OBSS and may merge them together into an OBSS Conflict Sector Table. The OBSS Conflict Sector Table, or the relevant parts thereof, may then be distributed to each of the APs in the OBSS. Each AP may then subsequently broadcast the OBSS Conflict Sector Table, or the relevant parts thereof, to all STAs in its BSS.

Similarly, AP2 may conduct OBSS sector training for all STAs within its range, such as STAs and AP1 in BSS1. AP2 may receive feedback directly from all STAs in BSS1 and from AP1, either using a scheduled RAW or PRAW, or using a contention-based method. Alternatively, AP1 may collect all OBSS sector feedback from all STAs associated with it and may construct a Conflict Sector Table and send it to AP2. In another implementation, AP1 may send the Conflict Sector Table to a coordinating AP in a centralized coordination scheme. The coordinating AP may merge all copies of the Conflict Sector Table into an OBSS Conflict Sector Table and may send it, or the relevant parts thereof, to each of the AP in the OBSS. Each AP may then subsequently broadcast the OBSS Conflict Sector Table, or the relevant parts thereof, to all STAs in its BSS.

Figure 16:
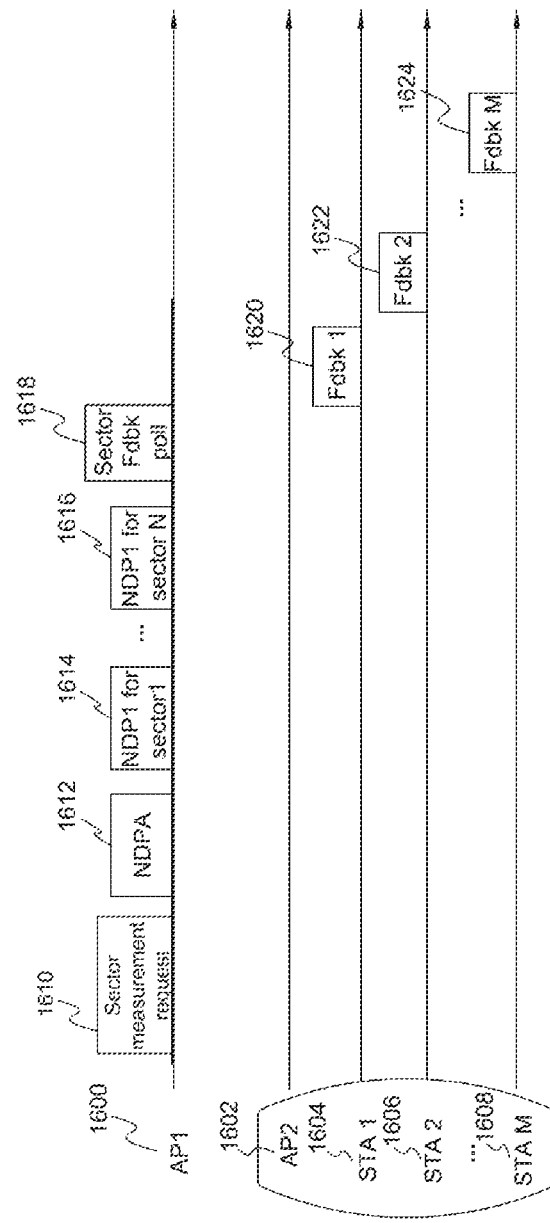
FIG. 16 shows an example procedure for explicit inter-AP sectorized transmission training and feedback.

Explicit OBSS sectorized training and feedback may be an alternative to implicit OBSS sectorized training and feedback. An example of the explicit OBSS sector training and feedback procedure is shown in FIG. 16. AP1 1600 may have observed a number of STAs within its range with which it is not associated. These STAs may include OBSS APs, such as AP2 1602, and STAs, such as STA1 1604, STA2 1606, . . . , STAM 1608. AP1 1600 may send out a broadcast or multicast sector measurement request 1610 to all OBSS STAs and APs, followed by null data packets (NDPs) 1612-1616 for each of its sectors. After AP1 1600 completes the transmission of the sectorized sounding packets 1612-1616, it may send out a Sector Feedback poll 1618. If the group of STAs being polled is known and an order has been pre-determined, AP1 may send out a multicast Sector Feedback poll. The OBSS STAs and APs may then transmit sector training feedback 1620-1624 according to the pre-determined order, one after another with an interframe space (IFS), for example, a short interframe space (SIFS), between them. In another implementation, instead of polling a group of STAs, the AP1 may individually send a Sector Feedback Poll to each of the known OBSS STAs and APs, to which the polled OBSS STA or AP may respond with a Sector Feedback frame.

Alternatively, AP2 may send out a Sector Feedback poll to collect OBSS sector training feedback from STAs associated with AP2. After collecting all OBSS sector training feedback from all of its associated STAs, AP2 may create a Conflict Sector Table and send it to AP1. In another implementation, AP2 may send the Conflict Sector Table to a coordinating AP in a centralized coordination scheme. The coordinating AP may merge all copies of the Conflict Sector Tables into an OBSS Conflict Sector Table and send the table, or the relevant parts thereof, to each of the APs in the OBSS.

Similarly, AP2 may conduct OBSS sector training for all STAs within its range, such as STAs and AP1 in BSS1. AP2 may directly receive feedback from all STAs in BSS1 and from AP1. Alternatively, AP1 may collect all OBSS sector feedback from all STAs associated with it, construct a Conflict Sector Table, and send the table to AP2. In another implementation, AP1 may send the Conflict Sector Table to a coordinating AP in a centralized coordination scheme. The coordinating AP may merge all copies of the Conflict Sector Tables from all APs in the OBSS into an OBSS Conflict Sector Table and send it, or the relevant parts thereof, to each of the APs in the OBSS. Each AP may then subsequently broadcast the OBSS Conflict Sector Table, or relevant parts thereof, to the STAs in its BSS.

As described above, the SO condition is currently defined as an OBSS STA/AP receiving an omni transmission preceding a sectorized transmission, but not receiving the sectorized transmission from an AP (which is either the TXOP holder or responder) or an expected transmission from a STA (which is either the TXOP responder or holder), such as an ACK.

An SO frame exchange sequence in addition to the sequences described above is now considered. An OBSS STA/AP which receives an omni-directional transmission from a STA reserving a sectorized TXOP (TXOP1) may initiate its own sectorized TXOP (TXOP2) if the associated sectorized transmission frame exchange sequence in TXOP2 is known not to conflict with the sectorized transmission frame exchange sequence in TXOP1. This additional SO Condition is described in detail herein.

Figure 17:
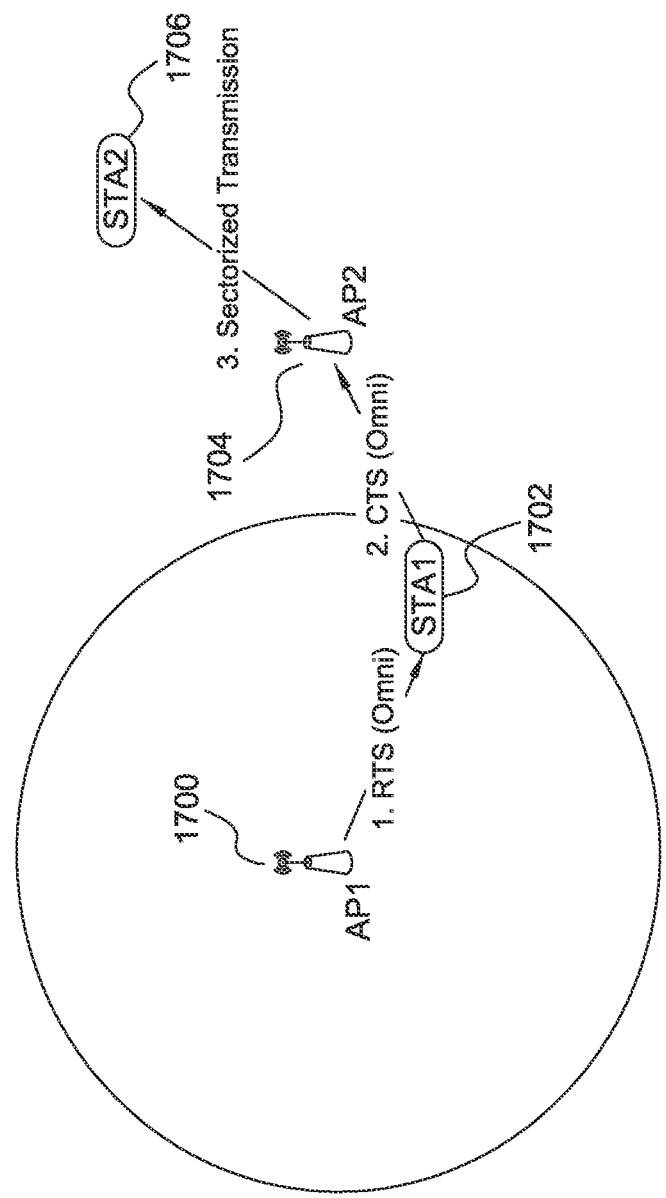
FIG. 17 is an illustration of an additional SO frame exchange sequence.

Referring to FIG. 17, if a NAV has not been set for any sectors nor for the omni-directional antenna pattern of AP1 1700, AP1 1700 may reserve the sectorized TXOP with STA1 1702 using an omni-directional RTS frame addressed to STA1 1702. The omni-directional RTS frame may carry a Sectorized TXOP indication and/or a Sector ID indication, or a combination thereof.

When STA1 1702 receives the RTS frame carrying the Sectorized TXOP indication and/or the Sector ID indication, it may respond by transmitting an omni-directional CTS frame carrying a Sectorized TXOP indication and/or a Sector ID indication. The Sector ID indication may be copied from the Sector ID Indication field of the preceding RTS frame. Upon receiving the CTS frame from STA1 1702, AP1 1700 may commence transmitting an HMP to STA1 1702 with an omni-directional portion that may carry a Sectorized TXOP indication and a Sector ID indication. In addition, the HMP may carry a Sectorized Transmission indication in either or both of the omni-directional and sectorized portions. Alternatively, AP1 1700 may commence transmitting a combination of an ODSP and a sectorized packet. The ODSP and the sectorized packet may carry a Sectorized TXOP indication and a Sector ID indication. In addition, either or both of the ODSP and the sectorized packet may carry a Sectorized Transmission indication.

When STA1 1702 receives the HMP, it may respond with an omni-directional frame. If the omni-directional frame is meant to further extend the sectorized TXOP, it may also carry a Sectorized TXOP indication and a Sector ID indication. If the omni-directional frame is the last frame of the frame exchange sequence, it may not carry Sectorized TXOP or Sector ID indications.

Figure 18:
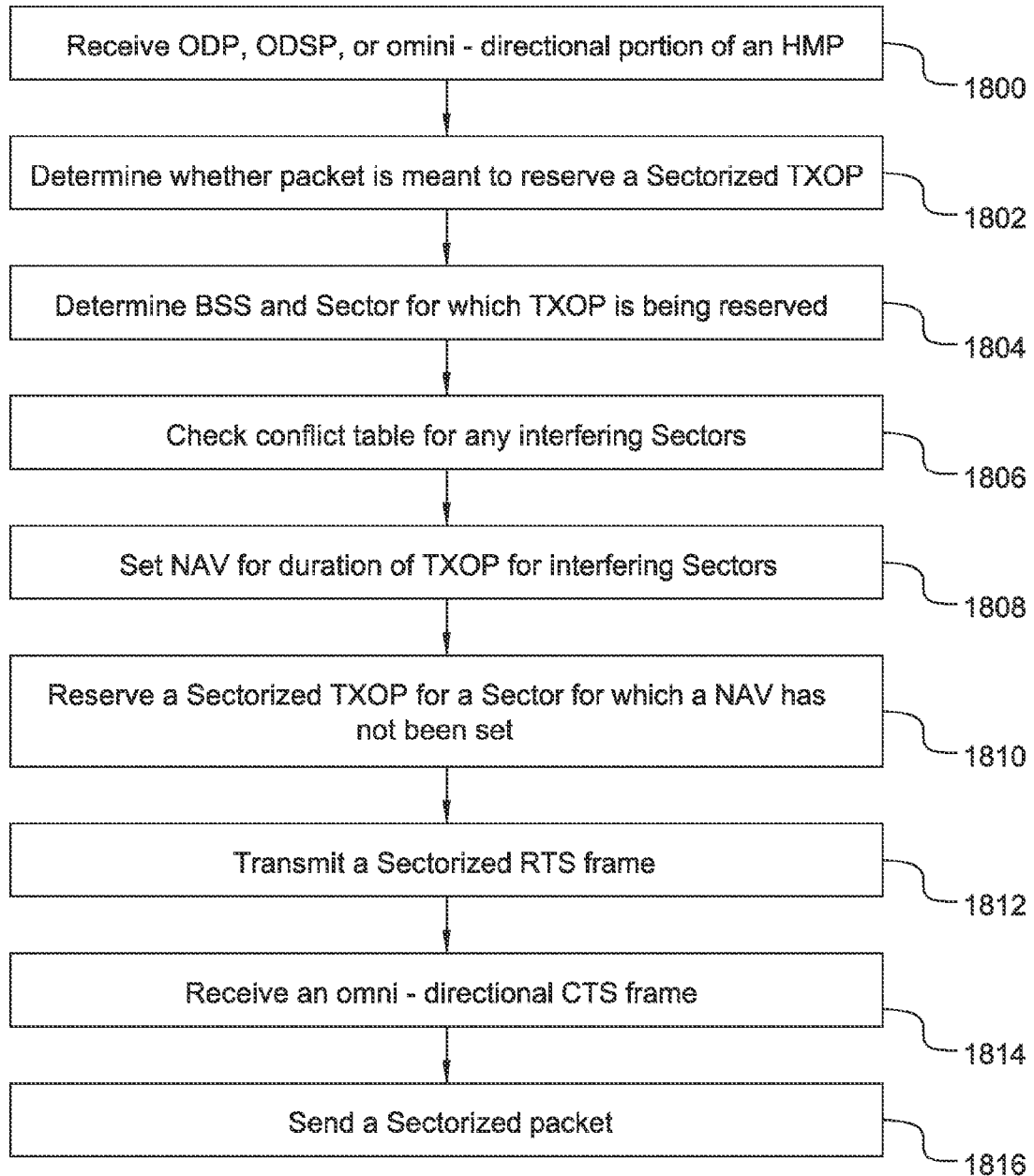
FIG. 18 describes a procedure for performing a sectorized transmission on a condition that the sectorized transmission is known not to conflict with an ongoing sectorized transmission.

Any OBSS STA that is capable of sectorized transmissions, such as AP2 1704 in FIG. 17, may initiate its own sectorized transmission, for example, to STA2 1706, if the associated sectorized transmission is known not to conflict with the transmission from AP1 1700 to STA1 1702. Referring now to FIG. 18, when AP2 receives an ODP, ODSP, or omni-directional portion of an HMP (step 1800), it may evaluate whether such an omni-transmission is meant to reserve a sectorized TXOP by examining the Sectorized TXOP indication (step 1802). If the packet carries a Sectorized TXOP indication and a Sector ID indication, the OBSS STA may evaluate whether the packet is transmitted by an OBSS non-AP STA. This may be determined based on the type/subtype of the frame. For example, a non-AP STA in a sectorized TXOP may transmit an omni-directional ACK/Response frame, CTS frame, or PS-Poll/Trigger frame. In such cases, the BSSID may be obtained from the DA or RA field of the omni-directional frame. Combining the BSSID and the Sector ID indication, an OBSS STA may determine the BSS and the sector for which a sectorized TXOP is being reserved by the omni-directional transmission (step 1804).

If the packet is transmitted by an OBSS non-AP STA, the additional SO condition described herein may apply, and the OBSS STA may refer to its own Conflict Sector table to see if there are any Interfering Sectors that are associated with the combination of BSSID and Sector ID identified above (step 1806). If any Interfering Sectors are discovered, the OBSS STA may set a NAV for the duration of the sectorized TXOP for these interfering sectors (step 1808).

If a NAV has been set for some of a STA's sectors, the STA may reserve a sectorized TXOP for a sector for which a NAV has not been set (step 1810). The STA may transmit a sectorized RTS (with the Sectorized Transmission indication, Sectorized TXOP indication, and Sector ID indication) in that sector (step 18). An intended STA receiving a sectorized RTS may reply using an omni-directional CTS frame carrying a Sectorized TXOP indication and Sector ID indication if a NAV has not been set for any of its sectors or for the omni-directional antenna pattern. The STA may then send a sectorized transmission, such as a data packet, to the intended STA (step 1816). In order to guarantee correct MAC operations, the sectorized TXOP reserved by the sectorized RTS may be required to end no later than the shortest NAV in any of the OBSS STA's sectors.

In another implementation, an OBSS STA/AP, when receiving a RTS carrying a Sectorized TXOP indication, may recognize that the RTS is used to reserve a sectorized TXOP. The OBSS STA/AP may attempt to detect a CTS and/or Hybrid Mode Packet (HMP). If the OBSS STA/AP has detected a RTS for reserving a sectorized TXOP, as well as the omni-portion of the HMP, and it does not hear the omni-directional CTS from the STA and the sectorized portion of the HMP, it may attempt to reserve a sectorized TXOP for itself.

A STA may initiate a sectorized TXOP as well. The detailed enhanced spatially orthogonal sectorized transmission procedure initiated by a STA may be as follows. If a STA, STA1, is only capable of transmitting or receiving using an omni-directional beam, the STA may transmit a PS-Poll, short PS-Poll, RTS, or any other type of trigger frame with a Sectorized TXOP and/or Sector ID indication to an AP or another STA such as a relay STA (for simplicity, the destination node will simply be referred to as AP1).

If a STA is capable of transmitting and/or receiving using an omni-directional or sectorized beam, it may behave as follows. If a NAV has not been set for any sectors or for the omni-directional antenna pattern of the STA, it may reserve a sectorized TXOP with an AP using an omni-directional RTS addressed to the AP that carries a Sectorized TXOP indication and/or a Sector ID indication, or a combination thereof. If a NAV has been set for some of the STA's sectors, it may transmit a sectorized PS-Poll, short PS-Poll, RTS, or any other type of trigger frame with a Sectorized TXOP, Sector ID, and/or Sectorized Transmission indication to the AP, if the transmitting sector does not conflict with the current sector NAVs. In order to guarantee correct MAC operations, the sectorized TXOP reserved by the sectorized PS-Poll, short PS-Poll, RTS or other type of trigger frame may be required to end no later than the shortest NAV in any of the STA's sectors.

When the AP receives the PS-Poll, short PS-Poll, RTS or any other type of trigger frame with a matching address and carrying a Sectorized TXOP indication and/or Sector ID indication, it may respond by transmitting an HMP to the STA with an omni-directional portion which carries a Sectorized TXOP indication and Sector ID indication, if no NAV has been set for any of the AP's sectors. In addition, the HMP may carry a Sectorized Transmission indication in either or both of the omni-directional and sectorized portions. The Sector ID indication may be copied from the Sector ID Indication field of the preceding PS-Poll, short PS-Poll, RTS, or other type of trigger frame.

Alternatively, the AP may transmit a combination of an ODSP and a sectorized packet. The ODSP and the sectorized packet may carry a Sectorized TXOP indication and a Sector ID indication. In addition, either or both of the ODSP and the sectorized packet may carry a Sectorized Transmission indication. If a NAV has been set for some of the AP's sectors, the AP may respond with a sectorized packet to the STA if the AP determines that the sectorized transmissions in the sectorized TXOP does not interfere with the current sector NAVs. In order to guarantee correct MAC operations, the AP may only be able to respond with a sectorized packet to the STA if the sectorized TXOP between the AP and the STA will end no later than the shortest NAV in any of the AP's sectors.

When the STA receives the HMP, it may respond with an omni-directional or a sectorized frame. If the omni-directional frame is meant to further extend the sectorized TXOP, it may also carry a Sectorized TXOP indication and a Sector ID indication. If the omni-directional frame is the last frame of the frame exchange sequence, it may not carry Sectorized TXOP or Sector ID indications. The behavior of an OBSS STA that is capable of sectorized transmission, such as an OBSS AP, may largely follow what is described above for OBSS STAs.

In another embodiment, an OBSS STA or AP, when receiving a PS-Poll, short PS-Poll, or other trigger frame, or an omni-directional portion of an HMP packet carrying a Sectorized TXOP indication, may recognize that the HMP is used to reserve a sectorized TXOP. The OBSS STA or AP may then attempt to detect an ODSP and/or Hybrid Mode Packet (HMP). If the OBSS STA or AP detects an ODSP or omni-directional portion of a HMP for reserving a sectorized TXOP, and it does not hear the PS-Poll, short PS-Poll, or trigger frames preceding it, it may attempt to reserve a sectorized TXOP for itself.

Although RTS and CTS frames are used herein as examples, it is understood that the enhanced spatially orthogonal reuse procedures may be designed to function with all types of omni-directional frames, omni-directional short frame, or omni-directional portions of HMPs that are used to reserve a sectorized TXOP, such as PS-Poll, short PS-Poll, sector RTS/CTS, regular or short response frames.

STAs and APs may provide indications that they are capable of fast sector feedback and other sectorization related capabilities using the Fast Sector Feedback IE shown FIG. 19. The Fast Sector Feedback IE 1900 may include the following fields. An Element ID field 1902 may include an ID that identifies the information element as a Fast Sector Feedback IE. The Length field 1904 may indicate the length of the Fast Sector Feedback IE 1900. The Fast Sector Feedback Capable field 1906 may indicate whether the AP or STA is capable of performing fast sector feedback. It may be implemented as one or more bits. For example, if the transmitter is capable of performing fast sector feedback, this field may contain "1"; otherwise, this field may contain "0".

The Fast Sector Feedback IE 1900 may further include a Fast Sector Feedback Operation field 1908 that indicates whether a fast sector feedback operation is used in the current BSS. It may be implemented as one or more bits. For example, if a fast sector feedback operation is used in the current BSS, the field may contain "1"; otherwise, the field may contain "0". An Accepted SO Conditions field 1910 may indicate which SO conditions are being supported by the transmitter or used in the current BSS. This field may be implemented as a bit map (for example, a bit map of length 4), wherein each bit indicates the support or use of a particular SO condition.

The Fast Sector Feedback IE 1900 may further include a Sectorization Directions field 1912 that indicates in which direction sectorized transmission may be used in the BSS or supported by the transmitter. This field may be implemented as a bitmap. For example, the field may be two bits long, with one bit indicating that the supported sectorization direction is downlink (DL), or AP to STA, and one bit indicating that the supported sectorization direction is uplink (UL), or STA to AP. In another example, the field may be three bit long, with one bit indicating that the supported sectorization direction is DL, one bit indicating that the supported sectorization direction is UL, and a third bit indicating that the supported sectorization direction is peer-to-peer (P2P). The Fast Sector Feedback IE 1900 may further include an HMP/ODSP Usage field 1914 that indicates whether HMP or ODSP should be used to reserve a sectorized TXOP.

Sub-1 GHz (S1G), 802.11ax, or 802.11 APs and STAs may include the Fast Sector Feedback IE 1900 in frames such as beacons, short beacons, or any other type of management, control or extension frames. For example, APs and STAs may include the Fast Sector Feedback IE 1900 in frames that they exchange at the time of association or at other times, such as Probe Request/Response frames, Association Request/Response frames, and short Probe Request/Response frames. The Fast Sector Feedback IE 1900 or any subset of the fields or subfields thereof may be implemented as a subfield or subset of subfields of any existing or new IE, such as the S1G/HEW Capability, S1G/HEW Extended Capability, Sector Operation, Sector Capability, Type 0 Sectorization Scheme, or Type 1 Sectorization Scheme elements, or as a part of any control, management, or extension frames, or MAC/PLCP headers.

A STA may provide fast sector feedback to an AP if its sector has changed since the last sectorized transmissions between it and the AP, or since the last sector feedback that the STA sent to the AP. The fast sector feedback procedure may include the following.

A STA may request sector training by sending a Sector Training Request to an AP. The AP, after receiving the Sector Training Request, may respond by sending a packet to the requesting STA that points to a periodic sector training that will start within a pre-defined interval from the time of the Sector Training Request. For example, the AP may include a schedule or starting time of the next periodic sector training, or may include the time until the start of the next sector training. The AP may also respond with an ACK, short ACK, or other type of response frame to acknowledge the reception of the Sector Training Request. The AP may initiate sector training within the pre-defined interval starting from the Sector Training Request. Alternatively or additionally, the AP may initiate sector training once it has received a certain number of Sector Training Request frames from the STAs.

At the beginning of the Sector ID feedback beacon subinterval, which may comprise a RAW, access window, target wake time (TWT), or time slots, the AP may use a Resource Allocation frame to assign a RAW, TWT, or time slots for STAs to transmit sector training feedback. Such a schedule may also be included in beacons, short beacons, or other types of management, control, or extension frames. Separate RAWs, access windows, time slots, and beacon intervals or subintervals may be reserved for STAs that have explicitly requested Sector training, or for STAs that overheard the sector training frames.

A STA that is not yet associated with an AP may overhear the sector training packets, and may include its Sector ID or a Preferred Sector field (which may be implemented as a bitmap) in the frames that it sends to the AP during association, such as Probe Request frames, Association Request frames, or any other type of management, control or extension frames. In order to improve efficiency, a fast sector feedback capable STA may choose not to send explicit sector training feedback in a separate frame. Instead, the fast sector feedback capable STA may include its new sector in an uplink packet sent to the AP when the STA and the AP reserve a sectorized TXOP.

For example, in an AP-initiated sectorized TXOP, the AP may send an omni-directional frame such as RTS or a Sector RTS frame, which may carry a Sectorized TXOP indication and/or Sector ID indication. The STA, after receiving the omni-directional frame, may respond with a modified CTS or other type of response frame that carries a Sector ID indication with its new sector ID, if it knows that its sector ID has changed since the last sectorized TXOP with the AP, or since the STA last sent sector training feedback to the AP. If the STA's sector ID has not changed, the STA may follow the regular sectorized TXOP reservation protocol. The AP, after receiving a modified response frame with a Sector ID indication, may subsequently send its sectorized transmission using the sector beam associated with the new sector ID. Otherwise, it may use the sector beam associated with the STA's old sector.

In a STA-initiated sectorized TXOP, the STA may send an omni-directional frame, such as PS-Poll frame, short PS-Poll frame, Sector PS-Poll frame, trigger frame, etc. The frame may carry a Sectorized TXOP indication and/or a Sector ID indication with the STA's new Sector ID, if the STA knows that its Sector ID has changed since its last sectorized TXOP with the AP, or since the STA last sent sector training feedback to the AP. If the STA's Sector ID has not changed, the STA may follow the regular sectorized TXOP reservation protocol by sending a regular PS-Poll, short PS-Poll, or trigger frame. The AP, after receiving the omni-directional frame, may respond with an HMP or a combination of an ODSP and a sectorized packet. The AP, after receiving a modified trigger frame with a Sector ID indication, may subsequently send its sectorized transmissions using the sector beam associated with the new Sector ID. Otherwise, it may use the sector beam associated with the STA's old sector.

The Sector RTS and PS-Poll frames may be implemented as S1G Control Frame Extensions, with a Type value B3 B2 set to 01, and the SIG Control Frame Extension Value B14 B15 set to 11. The Sector RTS and PS-Poll frames may also be implemented as HEW Control Frame Extensions. These frames may be implemented as any other type of NDP, control, action, or extension frames, and may contain a Sector ID indication in the frame body, preamble, or MAC headers.

Although the solutions described herein consider IEEE 802.11-specific protocols, it is understood that they are not restricted to this scenario and are applicable to other wireless systems as well. Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a first station (STA), wherein the first STA is an IEEE 802.11 STA, the method comprising:
receiving, from an access point (AP), an omni-directional request-to-send (RTS) frame indicating that an associated transmission opportunity (TXOP) will be a sectorized TXOP, wherein the omni-directional RTS frame further indicates a sector identifier (ID) associated with the sectorized TXOP;
transmitting an omni-directional clear-to-send (CTS) frame in response to the omni-directional RTS frame, wherein the omni-directional CTS frame indicates that the associated TXOP will be a sectorized TXOP, and wherein the omni-directional CTS frame further indicates the sector ID associated with the sectorized TXOP; and
receiving a sectorized transmission from the AP, wherein the sectorized transmission includes an indication of sectorized transmission and the sector ID associated with the sectorized TXOP;
wherein the sector ID associated with the TXOP included in the omni-directional CTS frame is the same as the omni-directional RTS frame.

2. The method of claim 1, wherein the omni-directional CTS frame enables a second STA in an overlapping basic service set (OBSS) to communicate with a second AP during the TXOP, on a condition that the second STA is in a sector that does not conflict with a sector of the first STA.

3. The method of claim 1, wherein the indication that the associated TXOP will be a sectorized TXOP and the indication of the sector ID associated with the sectorized TXOP are included in a Physical Layer Convergence Protocol (PLCP) header of the omni-directional RTS frame.

4. The method of claim 1, wherein the indication that the associated TXOP will be a sectorized TXOP and the indication of the sector ID associated with the TXOP are included in a Medium Access Control (MAC) field of the omni-directional RTS frame.

5. The method of claim 1, wherein the indication that the associated TXOP will be a sectorized TXOP and the indication of the sector ID associated with the TXOP are combined in a single field.

6. The method of claim 1, further comprising:
receiving, from the AP, an indication of a sector ID of at least one sector in an overlapping basic service set (OBSS) that interferes with a sector associated with the first STA.

7. A first station (STA) that is IEEE 802.11 compatible, comprising:
receiver circuitry configured to receive a first omni-directional clear-to-send (CTS) frame from a second STA in an overlapping basic service set (OBSS) reserving a first sectorized transmission opportunity (TXOP), wherein the first omni-directional CTS frame includes a first sector identifier (ID) associated with the first sectorized TXOP;
processing circuitry configured to determine whether a first sector associated with the first sector ID interferes with a second sector associated with a second sectorized TXOP;
transmitter circuitry configured to transmit, to a third STA, on a condition that the first sector associated with the first sector ID does not interfere with the second sector associated with the second TXOP, a sectorized request-to-send (RTS) frame indicating that an associated TXOP will be the second sectorized TXOP, wherein the sectorized RTS frame further indicates a second sector ID associated with the second sectorized TXOP;
the receiver circuitry further configured to receive, from the third STA, a second omni-directional CTS frame in response to the sectorized RTS frame; and the transmitter further configured to transmit, to the third STA, a sectorized transmission in response to the omni-directional CTS frame.

8. The first STA of claim 7, wherein the processing circuitry is further configured to determine whether the first sector associated with the first sector ID interferes with the second sector associated with the second TXOP based on an indication received from an AP of a plurality of sectors that interfere with the second sector associated with the second TXOP.

9. The first STA of claim 7, wherein the processing circuitry is further configured to determine whether the first sector associated with the first sector ID interferes with the second sector associated with the second TXOP based on whether a network allocation vector (NAV) has been set for the first sector.

10. The first STA of claim 7, wherein the sectorized transmission includes an indication of sectorized transmission and an indication of the second sector ID associated with the second sectorized TXOP.

11. The first STA of claim 7, wherein the indication that the associated TXOP will be a sectorized TXOP and the indication of the sector ID associated with the sectorized TXOP are included in a Physical Layer Convergence Protocol (PLCP) header of the sectorized RTS frame or are included in a Medium Access Control (MAC) field of the sectorized RTS frame.

12. The first STA of claim 7, wherein the second sector ID associated with the second sectorized TXOP included in the second omni-directional CTS frame is the same as the sectorized RTS frame.

13. A first station (STA) that is IEEE 802.11 compatible, comprising:
receiver circuitry configured to receive, from an access point (AP), an omni-directional request-to-send (RTS) frame indicating that an associated transmission opportunity (TXOP) will be a sectorized TXOP, wherein the omni-directional RTS frame further indicates a sector identifier (ID) associated with the sectorized TXOP;
transmitter circuitry configured to transmit an omni-directional clear-to-send (CTS) frame in response to the omni-directional RTS frame, wherein the omni-directional CTS frame indicates that the associated TXOP will be a sectorized TXOP, and wherein the omni-directional CTS frame further indicates the sector ID associated with the sectorized TXOP; and
the receiver circuitry further configured to receive a sectorized transmission from the AP, wherein the sectorized transmission includes an indication of sectorized transmission and the sector ID associated with the sectorized TXOP;

wherein the sector ID associated with the sectorized TXOP included in the omni-directional CTS frame is the same as the omni-directional RTS frame.

14. The first STA of claim 13, wherein the omni-directional CTS frame enables a second STA in an overlapping basic service set (OBSS) to communicate with a second AP during the sectorized TXOP, on a condition that the second STA is in a sector that does not conflict with a sector of the first STA.

15. The first STA of claim 13, wherein the indication that the associated TXOP will be a sectorized TXOP and the indication of the sector ID associated with the TXOP are included in a Physical Layer Convergence Protocol (PLCP) header of the omni-directional RTS frame.

16. The first STA of claim 13, wherein the indication that the associated TXOP will be a sectorized TXOP and the indication of the sector ID associated with the TXOP are included in a Medium Access Control (MAC) field of the omni-directional RTS frame.

17. The first STA of claim 13, wherein the indication that the associated TXOP will be a sectorized TXOP and the indication of the sector ID associated with the TXOP are combined in a single field.

18. The first STA of claim 13, wherein the receiver circuitry is further configured to receive, from the AP, an indication of a Sector ID of at least one sector in an overlapping basic service set (OBSS) that interferes with a sector associated with the first STA.

* * * * *